United States Patent
Wang et al.

(10) Patent No.: US 11,330,502 B2
(45) Date of Patent: May 10, 2022

(54) COMMUNICATION METHOD AND APPARATUS

(71) Applicant: HUAWEI TECHNOLOGIES CO., LTD., Guangdong (CN)

(72) Inventors: Hong Wang, Beijing (CN); Wei Quan, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 48 days.

(21) Appl. No.: 16/703,576

(22) Filed: Dec. 4, 2019

(65) Prior Publication Data
US 2020/0112909 A1    Apr. 9, 2020

Related U.S. Application Data

(63) Continuation of application No. PCT/CN2017/090997, filed on Jun. 30, 2017.

(51) Int. Cl.
| | | |
|---|---|---|
| *H04W 8/24* | (2009.01) | |
| *H04W 48/08* | (2009.01) | |
| *H04W 76/20* | (2018.01) | |

(52) U.S. Cl.
CPC .......... *H04W 48/08* (2013.01); *H04W 8/24* (2013.01); *H04W 76/20* (2018.02)

(58) Field of Classification Search
CPC ................................ H04W 48/08; H04W 8/24
See application file for complete search history.

(56) References Cited

U.S. PATENT DOCUMENTS

| | | | |
|---|---|---|---|
| 10,070,464 B2* | 9/2018 | Tang | H04L 5/0092 |
| 2012/0076102 A1* | 3/2012 | Ko | H04B 7/0689 |
| | | | 370/329 |
| 2014/0098761 A1* | 4/2014 | Lee | H04W 4/70 |
| | | | 370/329 |

(Continued)

FOREIGN PATENT DOCUMENTS

| | | |
|---|---|---|
| CN | 102595533 A | 7/2012 |
| CN | 102932835 A | 2/2013 |

(Continued)

OTHER PUBLICATIONS

3GPP TSG RAN WG1 Meeting #89, R1-1708310, Sierra Wireless:"Reduced PSS/SSS Acquisition Time Analysis", Hangzhou, P.R. China May 15-19, 2017, total 9 pages.

(Continued)

*Primary Examiner* — Parth Patel
(74) *Attorney, Agent, or Firm* — Gregg L. Jansen

(57) ABSTRACT

A communication method and an apparatus are disclosed, and the method includes: receiving, by a terminal, first indication information sent by a first network device; and if the first indication information indicates the second network device supports the enhanced signal transmission, receiving, by the terminal, an enhanced downlink signal sent by the second network device, where the second network device is a neighboring network device of the first network device. This avoids a technical problem that a delay is relatively long because the terminal still receives a downlink signal in an existing manner when the terminal cannot accurately obtain whether the second network device supports the enhanced signal transmission.

17 Claims, 12 Drawing Sheets

(56) References Cited

U.S. PATENT DOCUMENTS

| | | | |
|---|---|---|---|
| 2015/0201326 A1* | 7/2015 | Kazmi | H04W 8/24 370/329 |
| 2016/0013879 A1* | 1/2016 | Webb | H04W 72/0446 370/336 |
| 2016/0127918 A1* | 5/2016 | Yi | H04W 16/26 370/329 |
| 2016/0192261 A1* | 6/2016 | Wang | H04W 36/0011 370/331 |
| 2016/0192333 A1* | 6/2016 | Wang | H04L 1/0026 370/329 |
| 2016/0210083 A1* | 7/2016 | Oh | G06F 3/0616 |
| 2016/0227567 A1* | 8/2016 | Xu | H04L 5/006 |
| 2016/0302174 A1* | 10/2016 | Chatterjee | H04W 72/06 |
| 2016/0345119 A1* | 11/2016 | Futaki | H04W 24/04 |
| 2016/0353342 A1* | 12/2016 | Futaki | H04W 36/0085 |
| 2017/0026863 A1* | 1/2017 | Wang | H04W 4/70 |
| 2017/0238217 A1* | 8/2017 | Futaki | H04W 36/0085 370/332 |
| 2017/0265174 A1* | 9/2017 | Wang | H04W 72/042 |
| 2017/0273011 A1* | 9/2017 | Rico Alvarino | H04W 4/70 |
| 2017/0311319 A1* | 10/2017 | Lee | H04L 1/1822 |
| 2018/0269962 A1* | 9/2018 | Liu | H04W 48/18 |
| 2018/0279239 A1* | 9/2018 | Si | H04W 76/28 |
| 2018/0359790 A1* | 12/2018 | Ingale | H04W 28/16 |
| 2019/0349872 A1* | 11/2019 | Harada | H04L 5/0082 |
| 2019/0372719 A1* | 12/2019 | Talarico | H04W 72/042 |
| 2020/0112909 A1* | 4/2020 | Wang | H04W 48/08 |
| 2020/0169980 A1* | 5/2020 | Du | H04W 4/06 |
| 2020/0187177 A1* | 6/2020 | Lee | H04L 1/189 |

FOREIGN PATENT DOCUMENTS

| | | |
|---|---|---|
| CN | 103533587 A | 1/2014 |
| CN | 103581960 A | 2/2014 |
| CN | 105324946 A | 2/2016 |
| CN | 105453603 A | 3/2016 |
| CN | 106712913 A | 5/2017 |
| JP | 2011097142 A | 5/2011 |
| JP | 2016519874 A | 7/2016 |
| JP | 2017536778 A | 12/2017 |
| WO | 2008046339 A1 | 4/2008 |
| WO | 2014055878 A1 | 4/2014 |
| WO | 2015114693 A1 | 8/2015 |
| WO | 2015114695 A1 | 8/2015 |
| WO | 2016090124 A1 | 6/2016 |
| WO | 2016153026 A1 | 9/2016 |
| WO | 2017103680 A1 | 6/2017 |

OTHER PUBLICATIONS

3GPP TSG RAN WG1 Meeting #89, R1-1707090:"Discussion on system acquisition time reduction for MTC", ZTE, Hangzhou, China May 15-19, 2017,total 6 pages.

3GPP TS 36.133 V14.3.0 (Mar. 2017),3rd Generation Partnership Project;Technical Specification Group Radio Access Network;Evolved Universal Terrestrial Radio Access (E-UTRA);Requirements for support of radio resource management(Release 14), total 2387 pages.

3GPP TS 36.300 V14.3.0 (Jun. 2017),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 14), total 331 pages.

3GPP TS 36.211 V14.3.0 (Jun. 2017),3rd Generation Partnership Project;Technical Specification Group Radio Access Network;Evolved Universal Terrestrial Radio Access (E-UTRA);Physical channels and modulation(Release 14), total 196 pages.

3GPP TS 36.331 V13.6.0 (Jun. 2017),3rd Generation Partnership Project;Technical Specification Group Radio Access Network;Evolved Universal Terrestrial Radio Access (E-UTRA);Radio Resouice Control (RRC);Protocol specification (Release 13), total 639 pages.

RAN4,"LS to RAN1, RAN2 on FeMTC SI acquisition delay",3GPP TSG RAN WG2#97,R2-1700711,Athens, Greece, Feb. 13-17, 2017, total 2 pages.

RAN4,"LS to RAN1, RAN2 on FeMTC SI acquisition delay",3GPP TSG-RAN WG4 Meeting #81,R4-1611001,Reno, USA, Nov. 14-18, 2016, total 1 pages.

MCC Support,"Final Report of 3GPP TSG RAN WG1 #88bis v1.0.0",3GPP TSG RAN WG1 Meeting #89, R1-1708890, Hangzhou, China, May 15-19, 2017, total 154 pages.

Huawei, HiSilicon, Cell search and system information acquisition improvements in eFeMTC. 3GPP TSG RAN WG1 Meeting #89, Hangzhou, China, May 15-19, 2017, R1-1707017, 4 pages.

* cited by examiner

Signal of an extended bandwidth

Signal of an extended bandwidth

COMMUNICATION METHOD AND APPARATUS

CROSS-REFERENCE TO RELATED APPLICATIONS

This application is a continuation of International Application No. PCT/CN2017/090997, filed on Jun. 30, 2017, the disclosure of which is hereby incorporated by reference in its entirety.

TECHNICAL FIELD

This application relates to the field of communications technologies, and in particular, to a communication method and an apparatus.

BACKGROUND

A Long Term Evolution (Long Term Evolution, LTE) system needs to support a machine type communication (Machine Type Communication, MTC) function. Unlike conventional LTE communication for which a high data transmission rate and multiband and multi-antenna communication are goals to be reached, LTE MTC aims to implement a longer standby time of a battery of a terminal and lower hardware costs of the terminal, that is, the terminal is required to implement low power consumption (Low power consumption) and low costs (Low cost).

Considering that signal coverage strength of an MTC-type terminal may fail to meet a signal receiving requirement in an application scenario (such as a water meter or an electricity meter) of the terminal, currently a base station repeatedly (Repetition) sends a signal (such as data or a control channel), so that the base station and the terminal can support coverage enhancement (Coverage enhancement). In the prior art, coverage enhancement is not performed on a synchronization signal. In an example of frequency division duplex (Frequency Division Duplex, FDD), a primary synchronization signal (Primary Synchronization Signal, PSS) is sent on a last symbol (Symbol) of a first timeslot (Slot) in each of a subframe (Subframe) 0 and a subframe 5 of each system frame (System Frame), and a secondary synchronization signal (Secondary Synchronization Signal, SSS) is sent on a previous symbol of the symbol occupied by the PSS. The PSS and the SSS are sent once every 5 ms. In this way, a synchronization signal receiving success rate can be increased through a plurality of times of reception and combination by the terminal.

However, in this manner, when the terminal is in relatively weak signal coverage, the terminal can receive a signal (such as a synchronization signal) or a message only through a plurality of times of continuous reception. Consequently, the terminal takes a long time to obtain a signal sent by the base station.

SUMMARY

This application provides a communication method and an apparatus, to resolve a prior-art technical problem that a terminal takes a relatively long time to obtain a signal sent by a base station.

According to a first aspect, an embodiment of the present disclosure provides a communication method, and the method includes:

receiving, by a terminal, first indication information sent by a first network device, where the first indication information is used to indicate whether a second network device supports enhanced signal transmission, the second network device is a neighboring network device of the first network device, and the enhanced signal transmission means a repetition transmission of a signal in a specified time length, and/or a signal is transmitted on N subcarriers of a system bandwidth, where N is greater than 72; and if the second network device supports the enhanced signal transmission, receiving, by the terminal based on the first indication information, an enhanced downlink signal sent by the second network device.

In this way, the terminal can determine, by receiving the first indication information sent by the first network device, whether the neighboring network device of the first network device supports the enhanced signal transmission, and the terminal may receive the enhanced downlink signal if the neighboring network device supports the enhanced signal transmission, thereby effectively reducing a delay caused when the terminal receives a downlink signal sent by a network device. This avoids a technical problem that a delay is relatively long because the terminal still receives a downlink signal in an existing manner when the terminal cannot accurately obtain whether the second network device supports the enhanced signal transmission.

In a possible design, before the receiving, by a terminal, first indication information sent by a first network device, the method further includes: reporting, by the terminal, capability information to the first network device, where the capability information is used to indicate that the terminal supports the enhanced signal transmission.

According to a second aspect, an embodiment of the present disclosure provides a communication method, and the method includes:

receiving, by a first network device, second indication information sent by a second network device, where the second indication information is used to indicate whether the second network device supports enhanced signal transmission, the second network device is a neighboring network device of the first network device, and the enhanced signal transmission means a repetition transmission of a signal in a specified time length, and/or a signal is transmitted on N subcarriers of a system bandwidth, where N is greater than 72; and sending, by the first network device, first indication information to a terminal, where the first indication information is used to indicate whether the second network device supports the enhanced signal transmission.

In this way, the first network device obtains, by receiving the second indication information sent by the second network device, whether the second network device supports the enhanced signal transmission. Because the first network device and the second network device may obtain, through information interaction, whether a neighboring network device supports the enhanced signal transmission, the solution in this application has better adaptability. If an existing networking system is not significantly improved, the solution in this application may be used.

In a possible design, the sending, by the first network device, first indication information to a terminal includes:

sending, by the first network device, a system broadcast message to the terminal, where the system broadcast message includes the first indication information; or sending, by the first network device, a radio resource control connection reconfiguration message to the terminal, where the radio resource control connection reconfiguration message includes the first indication information.

In a possible design, the receiving, by a first network device, second indication information sent by a second network device includes:

receiving, by the first network device, a configuration update message sent by the second network device, where the configuration update message includes the second indication information.

In a possible design, the receiving, by a first network device, second indication information sent by a second network device includes:

receiving, by the first network device, a handover response message sent by the second network device, where the handover response message includes the second indication information.

In a possible design, before the receiving, by the first network device, a handover response message sent by the second network device, the method further includes:

reporting, by the first network device, capability information reported by the terminal, where the capability information is used to indicate that the terminal supports the enhanced signal transmission; and sending, by the first network device, a handover request message to the second network device, where the handover request message includes the capability information.

According to a third aspect, an embodiment of the present disclosure provides a communication method, and the method includes:

generating, by a second network device, second indication information, where the second indication information is used to indicate whether the second network device supports enhanced signal transmission, and the enhanced signal transmission means a repetition transmission of a signal in a specified time length, and/or a signal is transmitted on N subcarriers of a system bandwidth, where N is greater than 72; and sending, by the second network device, the second indication information to a first network device, where the first network device is a neighboring network device of the second network device.

In this way, the second network device sends the second indication information to the first network device, so that the first network device can obtain whether the second network device supports the enhanced signal transmission. Because the first network device and the second network device may obtain, through information interaction, whether a neighboring network device supports the enhanced signal transmission, the solution in this application has better adaptability. If an existing networking system is not significantly improved, the solution in this application may be used.

In a possible design, the sending, by the second network device, the second indication information to a first network device includes:

sending, by the second network device, a configuration update message to the first network device, where the configuration update message includes the second indication information.

In a possible design, the sending, by the second network device, the second indication information to a first network device includes:

sending, by the second network device, a handover response message to the first network device, where the handover response message includes the second indication information.

In a possible design, before the sending, by the second network device, a handover response message to the first network device, the method further includes:

receiving, by the second network device, a handover request message sent by the first network device, where the handover request message includes capability information of a terminal; and determining, by the second network device based on the capability information of the terminal, that the terminal supports the enhanced signal transmission, and then enabling the enhanced signal transmission to send an enhanced downlink signal.

In this way, after receiving the handover request message sent by the first network device, the second network device may determine, based on the capability information of the terminal included in the handover request message, whether the terminal supports the enhanced signal transmission, and if the terminal supports the enhanced signal transmission, enable the enhanced signal transmission to send the enhanced downlink signal. In other words, after determining that the terminal supporting the enhanced signal transmission is to be handed over, the second network device supporting the enhanced signal transmission enables the enhanced signal transmission to send the enhanced downlink signal. This can effectively avoid a problem that radio resources are excessively occupied because the second network device always sends the enhanced downlink signal, and can ensure that the terminal supporting the enhanced signal transmission receives the enhanced downlink signal, thereby shortening a delay of receiving a downlink signal by the terminal.

The first aspect, the second aspect, and the third aspect may further include the following content:

In a possible design, if the second network device supports the enhanced signal transmission, the second indication information includes a repetition count of the enhanced downlink signal sent by the second network device in a specified time length, and the specified time length is a length of one timeslot, a length of one subframe, or a length of one system frame.

In a possible design, if the second network device supports the enhanced signal transmission, the second indication information includes time information of sending the enhanced downlink signal by the second network device; and the time information includes a symbol number, or the time information includes a subframe number and a symbol number.

In a possible design, if the second network device supports the enhanced signal transmission, the second indication information includes frequency information of sending the enhanced downlink signal by the second network device; and the frequency information includes at least one of the following: a resource element location, a narrowband index, and a frequency.

In a possible design, the enhanced downlink signal is any one or any combination of an enhanced primary synchronization signal PSS, an enhanced secondary synchronization signal SSS, and an enhanced physical broadcast channel PBCH.

According to a fourth aspect, this application provides a communications entity, and the communications entity may include a sending module, a receiving module, and a processing module. The communications entity may be configured to implement steps of the procedure executed by the terminal or the first network device or the second network device in the method embodiments shown in the first aspect, the second aspect, and the third aspect, and description is separately provided below.

(1) The communications entity is configured to implement the steps of the procedure executed by the terminal in the method embodiment shown in the first aspect. In this case, the communications entity may be the terminal or a chip inside the terminal, and details are as follows:

The receiving module is configured to receive first indication information sent by a first network device. The first indication information is used to indicate whether a second network device supports enhanced signal transmission, the second network device is a neighboring network device of the first network device, and the enhanced signal transmission means a repetition transmission of a signal in a specified time length, and/or a signal is transmitted on N subcarriers of a system bandwidth, where N is greater than 72.

The processing module is configured to determine, based on the first indication information, whether the second network device supports the enhanced signal transmission.

The receiving module is further configured to: if the processing module determines that the second network device supports the enhanced signal transmission, receive, based on the first indication information, an enhanced downlink signal sent by the second network device.

In a possible design, the sending module is configured to report capability information to the first network device before the receiving module receives the first indication information sent by the first network device. The capability information is used to indicate that the terminal supports the enhanced signal transmission.

(2) The communications entity is configured to implement the steps of the procedure executed by the first network device in the method embodiment shown in the second aspect. In this case, the communications entity may be the first network device or a chip inside the first network device, and details are as follows:

The receiving module is configured to receive second indication information sent by a second network device. The second indication information is used to indicate whether the second network device supports enhanced signal transmission, the second network device is a neighboring network device of the first network device, and the enhanced signal transmission means a repetition transmission of a signal in a specified time length, and/or a signal is transmitted on N subcarriers of a system bandwidth, where N is greater than 72.

The processing module is configured to determine, based on the second indication information, whether the second network device supports the enhanced signal transmission.

The sending module is configured to send first indication information. The first indication information is used to indicate whether the second network device supports the enhanced signal transmission.

In a possible design, the sending module is specifically configured to:

send a system broadcast message, where the system broadcast message includes the first indication information; or send a radio resource control connection reconfiguration message, where the radio resource control connection reconfiguration message includes the first indication information.

In a possible design, the receiving module is specifically configured to:

receive a configuration update message sent by the second network device, where the configuration update message includes the second indication information.

In a possible design, the receiving module is specifically configured to:

receive a handover response message sent by the second network device, where the handover response message includes the second indication information.

In a possible design, the receiving module is further configured to: before receiving the handover response message sent by the second network device, receive capability information reported by a terminal. The capability information is used to indicate that the terminal supports the enhanced signal transmission.

The sending module is further configured to send a handover request message to the second network device. The handover request message includes the capability information.

(3) The communications entity is configured to implement the steps of the procedure executed by the second network device in the method embodiment shown in the third aspect. In this case, the communications entity may be the second network device or a chip inside the second network device, and details are as follows:

The processing module is configured to generate second indication information. The second indication information is used to indicate whether the second network device supports enhanced signal transmission, and the enhanced signal transmission means a repetition transmission of a signal in a specified time length, and/or a signal is transmitted on N subcarriers of a system bandwidth, where N is greater than 72.

The sending module is configured to send second indication information to a first network device. The first network device is a neighboring network device of the second network device.

In a possible design, the sending module is specifically configured to:

send a configuration update message to the first network device, where the configuration update message includes the second indication information.

In a possible design, the sending module is specifically configured to:

send a handover response message to the first network device, where the handover response message includes the second indication information.

In a possible design, the receiving module is configured to: before the sending module sends the handover response message to the first network device, receive a handover request message sent by the first network device. The handover request message includes capability information of a terminal.

The processing module is further configured to: determine, based on the capability information of the terminal, that the terminal supports the enhanced signal transmission, and then enable the enhanced signal transmission to send an enhanced downlink signal by using the sending module.

In this application, the foregoing cases (1), (2), and (3) may further include the following content:

In a possible design, if the second network device supports the enhanced signal transmission, the second indication information includes a repetition count of the enhanced downlink signal sent by the second network device in a specified time length, and the specified time length is a length of one timeslot, a length of one subframe, or a length of one system frame.

In a possible design, if the second network device supports the enhanced signal transmission, the second indication information includes time information of sending the enhanced downlink signal by the second network device; and the time information includes a symbol number, or the time information includes a subframe number and a symbol number.

In a possible design, if the second network device supports the enhanced signal transmission, the second indication information includes frequency information of sending the enhanced downlink signal by the second network device; and the frequency information includes at least one of the following: a resource element location, a narrowband index, and a frequency.

In a possible design, the enhanced downlink signal is any one or any combination of an enhanced primary synchronization signal PSS, an enhanced secondary synchronization signal SSS, and an enhanced physical broadcast channel PBCH.

According to a fifth aspect, this application provides a communications entity, and the communications entity has a function of the communications entity shown in the fourth aspect. The communications entity may include a communications module and a processor.

The communications module is configured to perform communication interaction with another device, and the communications module may be an RF circuit, a Wi-Fi module, a communications interface, a Bluetooth module, or the like.

The processor is configured to implement a function of the processing module in the fourth aspect.

Optionally, the communications entity may further include a memory, configured to store a program and the like. Specifically, the program may include program code, and the program code includes an instruction. The memory may include a RAM, and may further include a nonvolatile memory (nonvolatile memory), for example, at least one magnetic disk memory. The processor executes the application program stored in the memory, to implement the foregoing function.

In a possible manner, the communications module, the processor, and the memory are interconnected by using a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

This application further provides a computer readable storage medium.

The storage medium stores an instruction, and when the instruction runs on a computer, the computer executes the communication method provided in any one of the foregoing designs.

This application further provides a computer program product including an instruction. When the instruction runs on a computer, the computer executes the communication method provided in any one of the foregoing designs.

This application further provides a computer program. When the computer program runs on a computer, the computer executes the communication method provided in any one of the foregoing designs.

DESCRIPTION OF EMBODIMENTS

The following further describes in detail the embodiments of this application with reference to accompanying drawings.

Figure 1:
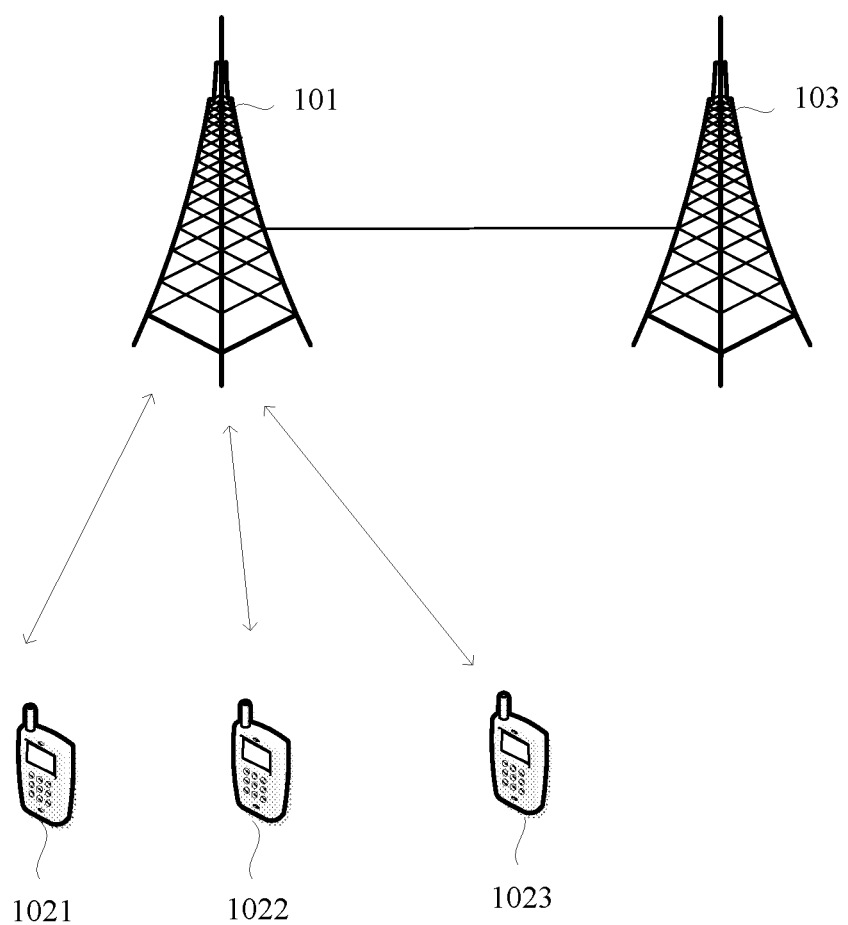
FIG. 1 is a schematic diagram of a system architecture to which this application is applied.

A communication method in this application can be applied to a plurality of system architectures. FIG. 1 is a schematic diagram of a system architecture to which this application is applied. As shown in FIG. 1, the system architecture includes a network device 101, a neighboring network device 103 of the network device 101, and one or more terminals that access the network device 101, for example, a first terminal 1021, a second terminal 1022, and a third terminal 1023 shown in FIG. 1. The network device 101 and the neighboring network device 103 may communicate with each other. For example, the network device 101 may send a configuration request message to the neighboring network device 103, and the neighboring network device 103 may respond based on the configuration request message. For another example, after determining that a terminal (for example, the first terminal) that accesses the network device 101 is to be handed over to the neighboring network device 103, the network device 101 may send a handover request message to the neighboring network device 103, and the neighboring network device 103 may respond based on the handover request message.

In this embodiment of the present disclosure, the network device and the neighboring network device each may be a base station device (Base Station, BS). The base station device may also be referred to as a base station, and is an apparatus that is deployed in a radio access network to provide a wireless communications function. For example, a device that provides a base station function in a 2G network includes a base transceiver station (Base Transceiver Station, BTS) and a base station controller (Base Station Controller, BSC). A device that provides a base station function in a 3G network includes a NodeB (NodeB) and a radio network controller (Radio Network Controller, RNC). A device that provides a base station function in a 4G network includes an evolved NodeB (evolved NodeB, eNB). A device that provides a base station function in a 5G NR network includes a new radio NodeB, a centralized unit (Centralized Unit, CU), a distributed unit (Distributed Unit, DU), and a new radio controller. A device that provides a base station function in a WLAN is an access point (Access Point, AP).

The terminal may be a device (Device) providing voice and/or data connectivity for a user, and may include a wired terminal and a wireless terminal. The wireless terminal may be a handheld device with a radio connection function, or another processing device connected to a wireless modem, and may be a mobile terminal that communicates with one or more core networks by using a radio access network. For example, the wireless terminal may be a mobile phone, a computer, a tablet computer, a personal digital assistant (Personal Digital Assistant, PDA for short), a mobile Internet device (Mobile Internet Device, MID for short), a wearable device, or an e-book reader (e-book reader). For another example, the wireless terminal may be a machine type communication (MTC) terminal, an Internet of Things (Internet of Things, IoT) terminal, or a portable, pocket-sized, handheld, computer built-in, or in-vehicle mobile device. For another example, the wireless terminal may be a part of a mobile station (mobile station), an access point (access point), or user equipment (user equipment, UE for short).

Communications systems to which the system architecture is applied include but are not limited to: Code Division Multiple Access (Code Division Multiple Access, CDMA) IS-95, Code Division Multiple Access (Code Division Multiple Access, CDMA) 2000, Code Division Multiple Access (Code Division Multiple Access, CDMA) 2000, Time Division-Synchronous Code Division Multiple Access (Time Division-Synchronous Code Division Multiple Access, TD-SCDMA), Wideband Code Division Multiple Access (Wideband Code Division Multiple Access, WCDMA), Time Division Duplex-Long Term Evolution (Time Division Duplex-Long Term Evolution, TDD LTE), Frequency Division Duplex-Long Term Evolution (Frequency Division Duplex-Long Term Evolution, FDD LTE), Long Term Evolution-Advanced (Long Term Evolution-Advanced, LTE-advanced), Long Term Evolution-machine-to-machine communication (Long Term Evolution-machine-to-machine communication, LTE M2M), and various evolved wireless communications systems in the future (for example, a 5G NR system).

In the prior art, taking synchronization as an example. If a terminal is to access an LTE cell, cell search needs to be performed first by using a synchronization channel. On a physical layer, the cell search includes a series of synchronization phase for implementing time synchronization and frequency synchronization. Therefore, in the synchronization phase, the terminal needs to frequently perform blind search, especially in a scenario in which narrowband M2M communication resources are limited, so that the terminal needs to perform a plurality of times of reception and combination to increase a synchronization signal receiving success rate. Consequently, a synchronization time is excessively long.

To resolve this problem, a possible idea provided in this application is that a network device performs enhanced downlink transmission, that is, the network device sends an enhanced downlink signal. The enhanced downlink signal is sent in an enhanced signal transmission manner. For example, the network device sends a downlink signal in a wider bandwidth, or the network device repeatedly sends a downlink signal in a specified time, to effectively reduce a delay of receiving a downlink signal by the terminal. It should be noted that this manner needs to be implemented when both the network device and the terminal support the enhanced signal transmission.

In this application, there may be one or more types of enhanced downlink signals sent by the network device, and a synchronization signal is used as an example. For example, an enhanced downlink synchronization signal sent by the network device may be an enhanced primary synchronization signal (Primary Synchronization Signal, PSS) and an enhanced secondary synchronization signal (Secondary Synchronization Signal, PSS), and therefore a delay of performing synchronization by the terminal can be reduced. Alternatively, an enhanced downlink synchronization signal sent by the network device may be an enhanced physical broadcast channel (Physical Broadcast Channel, PBCH), and therefore a delay of obtaining a system message by the terminal can be reduced. Alternatively, an enhanced downlink synchronization signal sent by the network device may include an enhanced PSS, an enhanced SSS, and an enhanced PBCH. This is not specifically limited in this application.

The following uses an example in which the enhanced downlink signals are an enhanced PSS and an enhanced SSS to describe a specific enhanced mode.

To describe an enhanced mode in this application more clearly, a PSS and an SSS in the prior art are first described.

Figure 2:
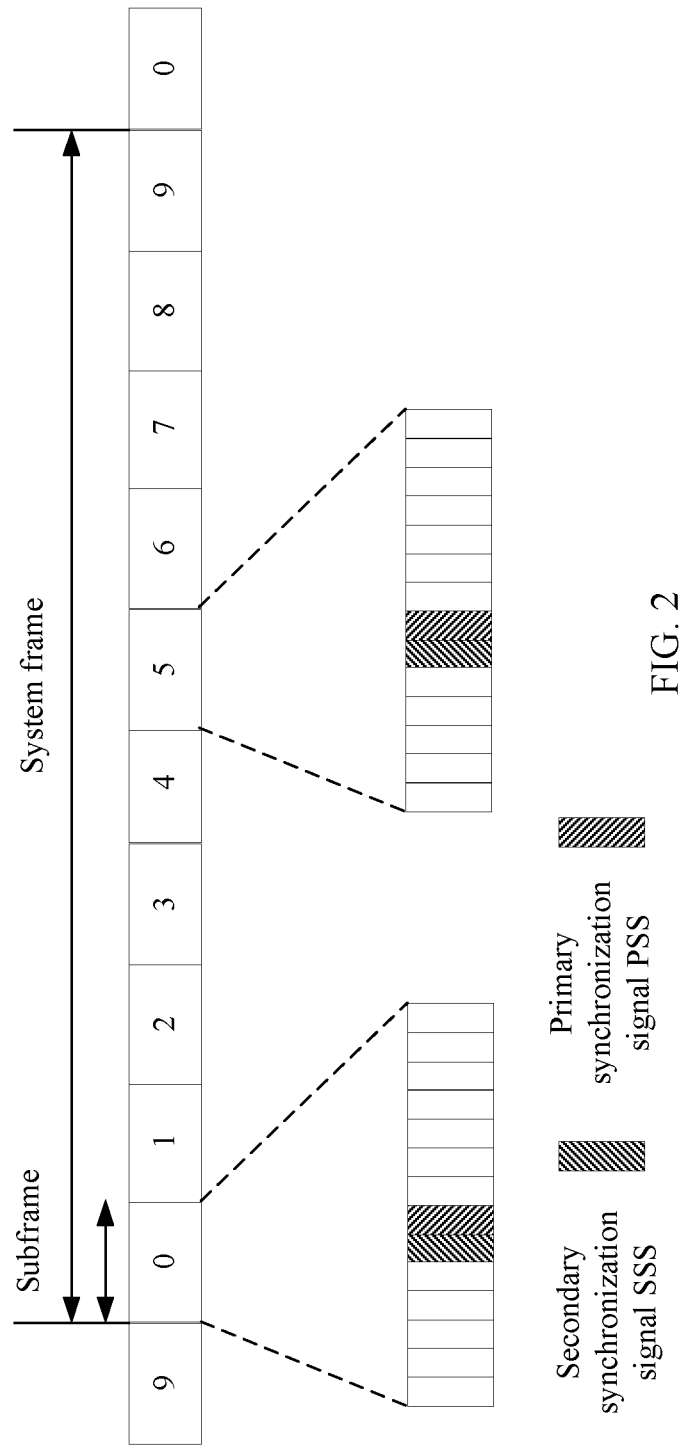
FIG. 2 is a schematic diagram of time-frequency resources on which a PSS and an SSS in existing LTE FDD are located.

FIG. 2 is a schematic diagram of time-frequency resources on which a PSS and an SSS in existing LTE FDD are located. As shown in FIG. 2, in LTE FDD, a PSS is sent on a last symbol (Symbol) of a first timeslot (Slot) in each of a subframe (subframe) 0 and a subframe 5 of each system frame (System Frame), and an SSS is sent on a previous symbol of the symbol occupied by the PSS. The sending period of PSS and the SSS is 5 ms.

In frequency domain, a PSS and an SSS occupy 72 subcarriers in a bandwidth center, where 62 subcarriers in a bandwidth center are used, and 5 subcarriers on each side are reserved as a guard band. A terminal attempts to receive a PSS and an SSS near a center frequency of an LTE bandwidth supported by the terminal.

The PSS uses a ZC (Zadoff-Chu) sequence with a length of 63 (because there is a DC subcarrier in the middle, an actual length for transmission is 62). The PSS that occupies 72 subcarriers in the bandwidth center is obtained by adding 5 subcarriers on each boundary that are additionally reserved as a guard band to the ZC sequence. The PSS has three values corresponding to three different ZC sequences, and each sequence corresponds to one physical cell identifier (Physical Cell Identifier, PCI) group number. A sequence corresponding to a PSS of a cell is determined by a PCI of the cell. As shown in Table 1, different group numbers correspond to different root sequence indexes (Root index u), and therefore different ZC sequences are determined.

TABLE 1

Schematic table of a correspondence between a group number and a root sequence index

| Group number | Root sequence index |
|---|---|
| 0 | 25 |
| 1 | 29 |
| 2 | 34 |

When receiving the PSS, the terminal uses the three root sequence indexes to attempt to decode the PSS respectively until the PSS is successfully decoded by using one of the root sequence indexes. In this case, the terminal obtains a group number of the cell. Because a location of the PSS is fixed in time domain, the terminal may obtain 5 ms timing (Timing) of the cell.

The SSS uses a sequence with a length of 62 obtained through cross-concatenation of two M sequences with a length of 31. Similar to the PSS, the SSS that occupies 72 subcarriers in the bandwidth center is obtained by adding 5 subcarriers on the boundary that are additionally reserved as a guard band to the sequence with a length of 62. In a system frame, an SSS cross-concatenation manner of the first half-frame is contrary to a cross-concatenation manner of the second half-frame. The PCI group number is corresponding to 168 SSS sequences, and details are not specifically described herein.

In an LTE system, the terminal obtains of a possible location of the SSS after detecting the PSS. After detecting and successfully decoding the SSS, the terminal determines one of 168 values of the SSS sequence, and then determines the PCI number.

It can be obtained from the foregoing content that, in an LTE synchronization process, a primary synchronization process is first performed. In the primary synchronization process, the terminal performs cyclic correlation between three groups of different local ZC sequences and a received PSS sequence, and determines a group number of the PSS sequence by using a correlation peak value, so as to complete time-domain synchronization. Then, secondary synchronization is performed. In a secondary synchronization process, the terminal performs cyclic correlation between 168 groups of different local M sequences and a received SSS sequence, and determines a group number of the SSS sequence by using a correlation peak value. In this case, the terminal performs synchronization by using the detected PSS sequence and the detected SSS sequence.

Based on the PSS and the SSS in the prior art, in a first possible enhanced mode provided in this application, a PSS and an SSS are repeatedly transmitted in a short time.

Figure 3A:
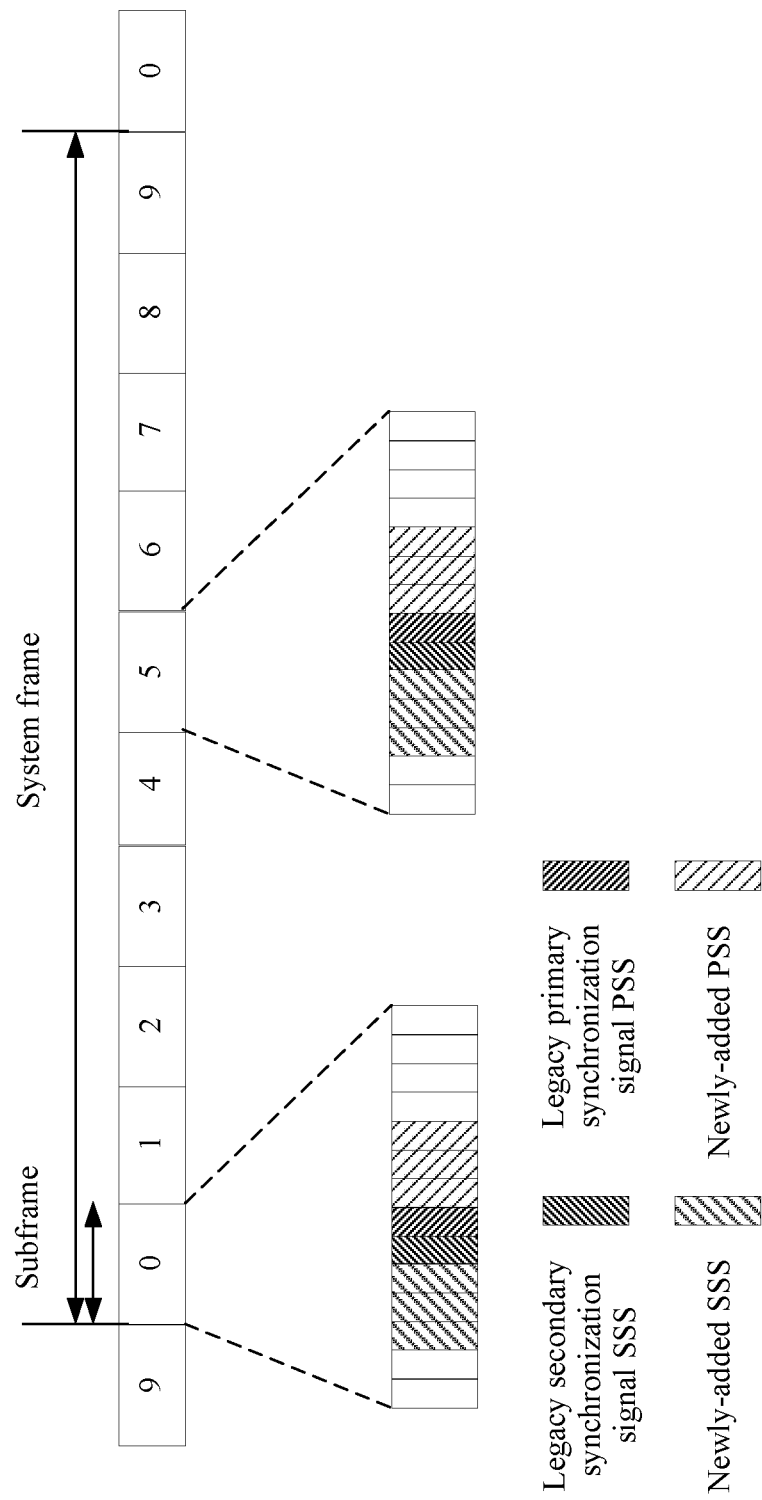
FIG. 3a is a schematic diagram of a first possible enhanced mode.

FIG. 3a is a schematic diagram of the first possible enhanced mode. Specifically, an enhanced PSS includes a PSS in the prior art (referred to as a legacy PSS) and a newly-added PSS. The newly-added PSS may be sent on a symbol that does not affect a reference signal in the prior art and/or a symbol that does not affect a control channel in the prior art. For example, newly-added PSSs are continuously sent on three symbols succeeding a symbol occupied by the legacy PSS. Similarly, an enhanced SSS includes an SSS in the prior art (referred to as a legacy SSS) and a newly-added SSS. The newly-added SSS may be sent on a symbol that does not affect a reference signal in the prior art and/or a symbol that does not affect a control channel in the prior art. For example, newly-added SSSs are continuously sent on three symbols preceding a symbol occupied by the legacy SSS. For details, refer to FIG. 3a.

Further, considering that some legacy terminals that do not support enhanced signal transmission still detect a PSS and an SSS in a prior-art manner, to avoid impact of the newly-added PSS and the newly-added SSS on detecting the PSS and the SSS by the legacy terminal, a value of a root sequence index of the newly-added PSS is different from a value of a root sequence index of the legacy PSS in this application. In other words, a ZC sequence of the newly-added PSS is different from the three ZC sequences in the prior art. Because a PSS sequence is orthogonal, the legacy terminal cannot detect the newly-added PSS. Similarly, an M sequence of the newly-added SSS may be different from the 168 M sequences in the prior art. In this case, the legacy terminal cannot detect the newly-added PSS and the newly-added SSS, but the legacy terminal can normally detect the PSS and the SSS in the existing manner. A terminal supporting the enhanced signal transmission can detect the legacy PSS, the newly-added PSS, the legacy SSS, and the newly-added SSS in one subframe, thereby increasing a PSS receiving success rate and an SSS receiving success rate, and reducing a PSS receiving delay and an SSS receiving delay. The M sequence of the newly-added SSS may be the same as the 168 M sequences in the prior art. The terminal detects the SSS after detecting the PSS. The legacy terminal detects the SSS on a previous symbol of a symbol on which the PSS is detected, and the terminal supporting the enhanced signal transmission detects the PSS on several symbols preceding a symbol on which the PSS is detected. Therefore, sequences used by SSSs may be the same.

For example, a legacy PSS sequence is [101010], and a newly-added PSS sequence is [010101]. Elements corresponding to the two sequences are multiplied and then are added to obtain a result 0. The legacy terminal uses [101010] to detect a PSS, and a detection process is as follows: On each symbol, the legacy terminal multiplies an element in a sequence known by the legacy terminal by an element in a sequence carried on the symbol and then performs an addition operation. When a result is greater than a preset threshold, it is considered that the PSS is detected; otherwise, no PSS is detected. The terminal supporting the enhanced signal transmission uses the PSS sequence in the prior art and the newly-added PSS sequence to detect the legacy PSS and the newly-added PSS.

In this application, to more fully use a PSS repeatedly transmitted in a short time, the terminal supporting the enhanced signal transmission may detect the enhanced PSS by using a detection window. If the terminal supporting the enhanced signal transmission obtains of a sending mode of the enhanced PSS, for example, the sending mode of the enhanced PSS is that sending is performed on four consecutive symbols shown in FIG. 3a. A legacy PSS is sent on a first symbol, and newly-added PSSs are sent on the last three symbols. In this case, the terminal supporting the enhanced signal transmission may perform detection on the four consecutive symbols when detecting the enhanced PSS. That is, the terminal uses [101010] for detection on a first symbol in every four symbols, uses [010101] for detection on the last three symbols, and performs an addition operation on detection results of all the symbols. When a detection result is maximum or greater than one threshold, the first symbol in the four detected symbols corresponds to an original PSS, namely, a legacy PSS, and the last three symbols correspond to newly-added PSSs.

The following describes a specific process in which the detection window is used for detection. For example, a sequence on each symbol is one numeral, and a sequence constituted by numerals on to-be-detected consecutive symbols is 000011110000, where 1 indicates a symbol with a PSS, and 0 indicates a symbol without a PSS. It can be obtained that PSSs are sent on four consecutive symbols. It is assumed that one symbol in a detection sequence is also one numeral, and the detection sequence is 1111, namely, the detection window.

In a detection process, a to-be-detected sequence is detected every four numerals from left to right, and then the detection window is shifted to the right by one numeral.

First detection: 0×1+0×1+0×1+0×1=0 (a numeral on the left side of a multiplication sign is obtained from the to-be-detected sequence, and a numeral on the right side is a numeral in the detection sequence) (0000 on the leftmost side is obtained for the first time)

Second detection: 0×1+0×1+0×1+1×1=1 (0001 is obtained for the second time)

Third detection: 0×1+0×1+1×1+1×1=2 (0011 is obtained for the third time)

Fourth detection: Ox 1+1×1+1×1+1×1=3 (0111 is obtained for the fourth time)

Fifth detection: 1×1+1×1+1×1+1×1=4 (1111 is obtained for the fifth time)

Sixth detection: 1×1+1×1+1×1+0×1=3 (1110 is obtained for the sixth time)

Seventh detection: 1×1+1×1+0×1+0×1=2 (1100 is obtained for the seventh time)

Eighth detection: 1×1+0×1+0×1+0×1=1 (1000 is obtained for the eighth time)

Ninth detection: 0×1+0×1+0×1+0×1=0 (0000 is obtained for the ninth time)

It can be obtained from the foregoing content that a result of the fifth detection is maximum, and therefore a first symbol in four detected symbols during the fifth detection corresponds to an original PSS.

The foregoing description is merely an example. The legacy PSS and the newly-added PSS may not be consecutively distributed in a subframe. In this case, the detection window needs to correspond to distribution of the legacy PSS and the newly-added PSS.

In a second possible enhanced mode provided in this application, transmit bandwidths of a PSS and an SSS are extended. In this case, an extended PSS and an extended SSS may use a legacy PSS sequence and a legacy SSS sequence, or may use a new sequence. Because the legacy terminal always performs detection on intermediate 6 PRBs, UE supporting the enhanced signal transmission performs detection on a wider bandwidth.

Figure 3B:
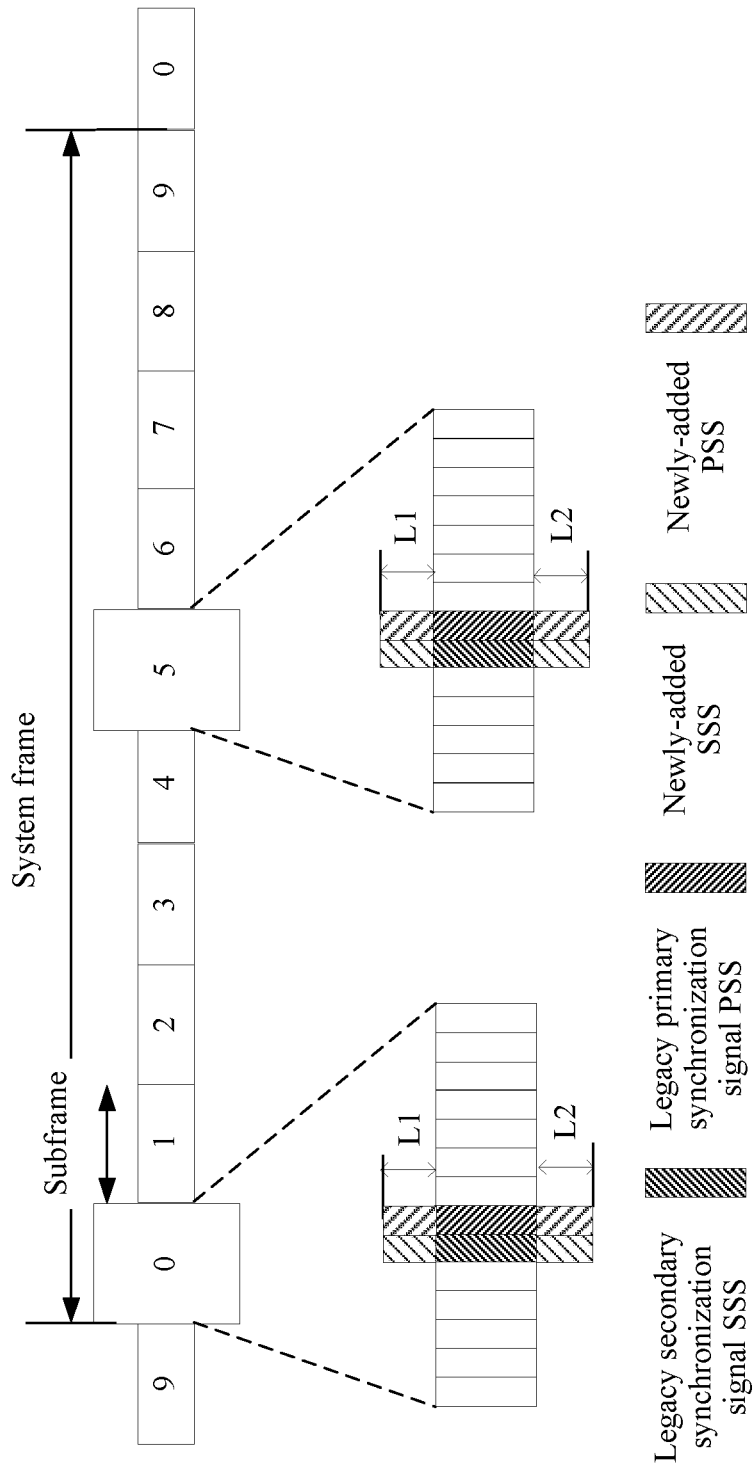
FIG. 3b is a schematic diagram of a second possible enhanced mode.
Figure 3C:
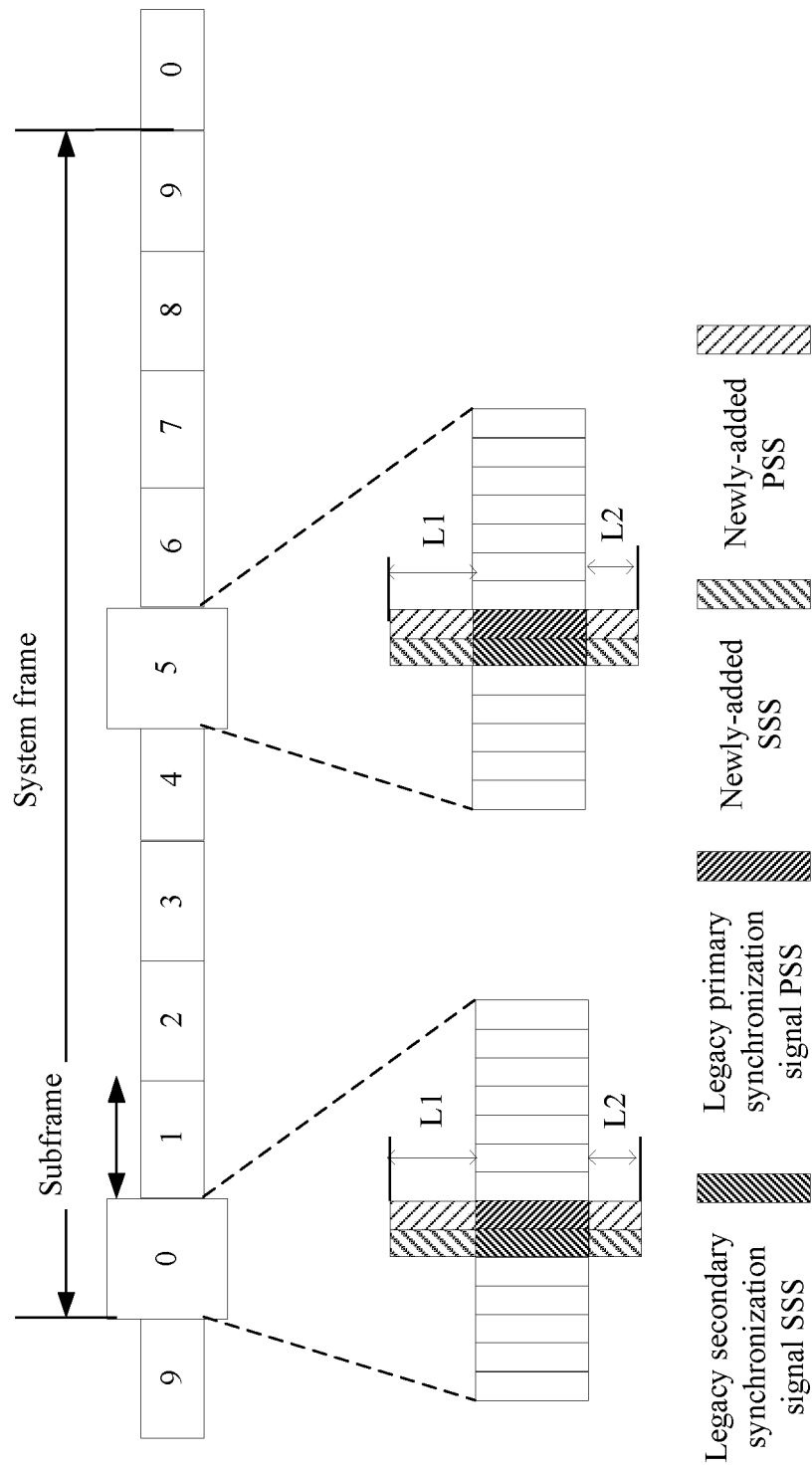
FIG. 3c is a schematic diagram of a third possible enhanced mode.

FIG. 3b and FIG. 3c are schematic diagrams of the second possible enhanced mode. Specifically, a legacy PSS and a legacy SSS are sent on central six physical resource blocks (Physical Resource Block, PRB) (72 subcarriers). In this application, an enhanced PSS and an enhanced SSS may be extended based on a bandwidth occupied by the legacy PSS. For example, the enhanced PSS and the enhanced SSS may be sent on central 12 PRBs. In this case, the legacy terminal may still use an original bandwidth to detect the legacy PSS and the legacy SSS, and the terminal supporting the enhanced signal transmission may use a wider bandwidth to detect the enhanced PSS and the enhanced SSS, thereby effectively increasing a PSS receiving success rate and an SSS receiving success rate, and reducing a PSS receiving delay and an SSS receiving delay.

It should be noted that in this application, the enhanced PSS and the enhanced SSS may be symmetrically extended based on the bandwidth occupied by the legacy PSS (as shown in FIG. 3b, an extended bandwidth L1 is equal to a bandwidth L2), or may not be symmetrically extended (as shown in FIG. 3c, an extended bandwidth L1 is not equal to a bandwidth L2). This is not specifically limited.

In a third possible enhanced mode provided in this application, a PSS and an SSS are repeatedly transmitted in a short time, and transmit bandwidths of the PSS and the SSS are extended, that is, a combination of the first and second possible enhanced modes.

Figure 3D:
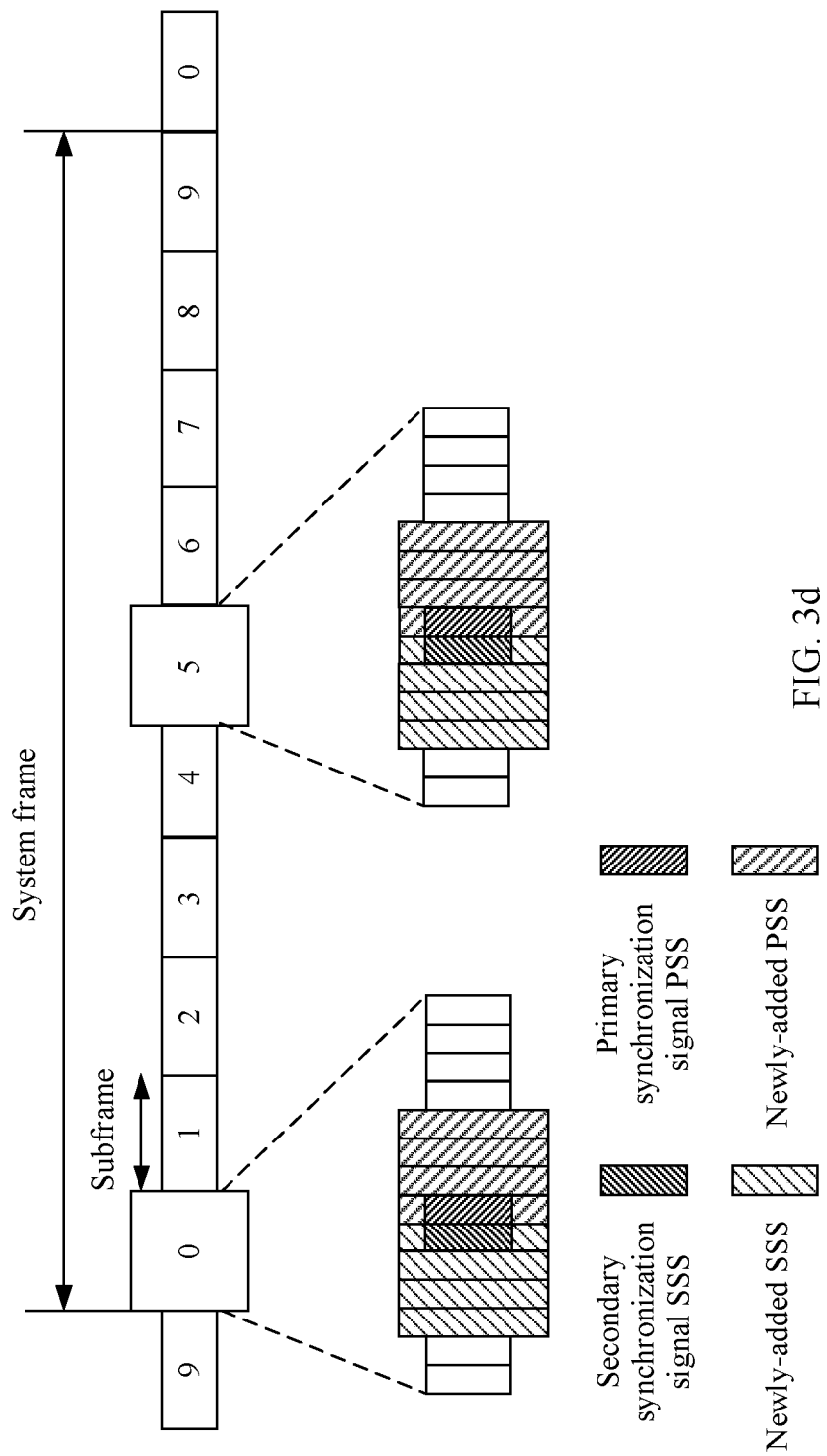
FIG. 3d is a schematic diagram of a fourth possible enhanced mode.

FIG. 3d is a schematic diagram of the third possible enhanced mode. For details, refer to the foregoing first and second possible enhancement modes. Details are not described herein again.

The foregoing content is specifically described for an enhanced downlink signal. In actual application, if some network devices support enhanced signal transmission, an enhanced downlink signal may be sent, or a downlink signal may be sent in an existing manner. If some network devices do not support the enhanced signal transmission, the downlink signal still needs to be sent in the existing manner. Likewise, if some terminals support the enhanced signal transmission, an enhanced downlink signal may be detected in a detection manner in this application, or a downlink signal may be detected in an existing manner. If some terminals do not support the enhanced signal transmission, the downlink signal still needs to be detected in an existing manner. Based on the above, how the network device supporting the enhanced signal transmission determines whether to send an enhanced downlink signal and how the terminal supporting the enhanced signal transmission determines whether to detect an enhanced downlink signal by using a detection method in this application are problems that need to be further resolved.

Figure 4:
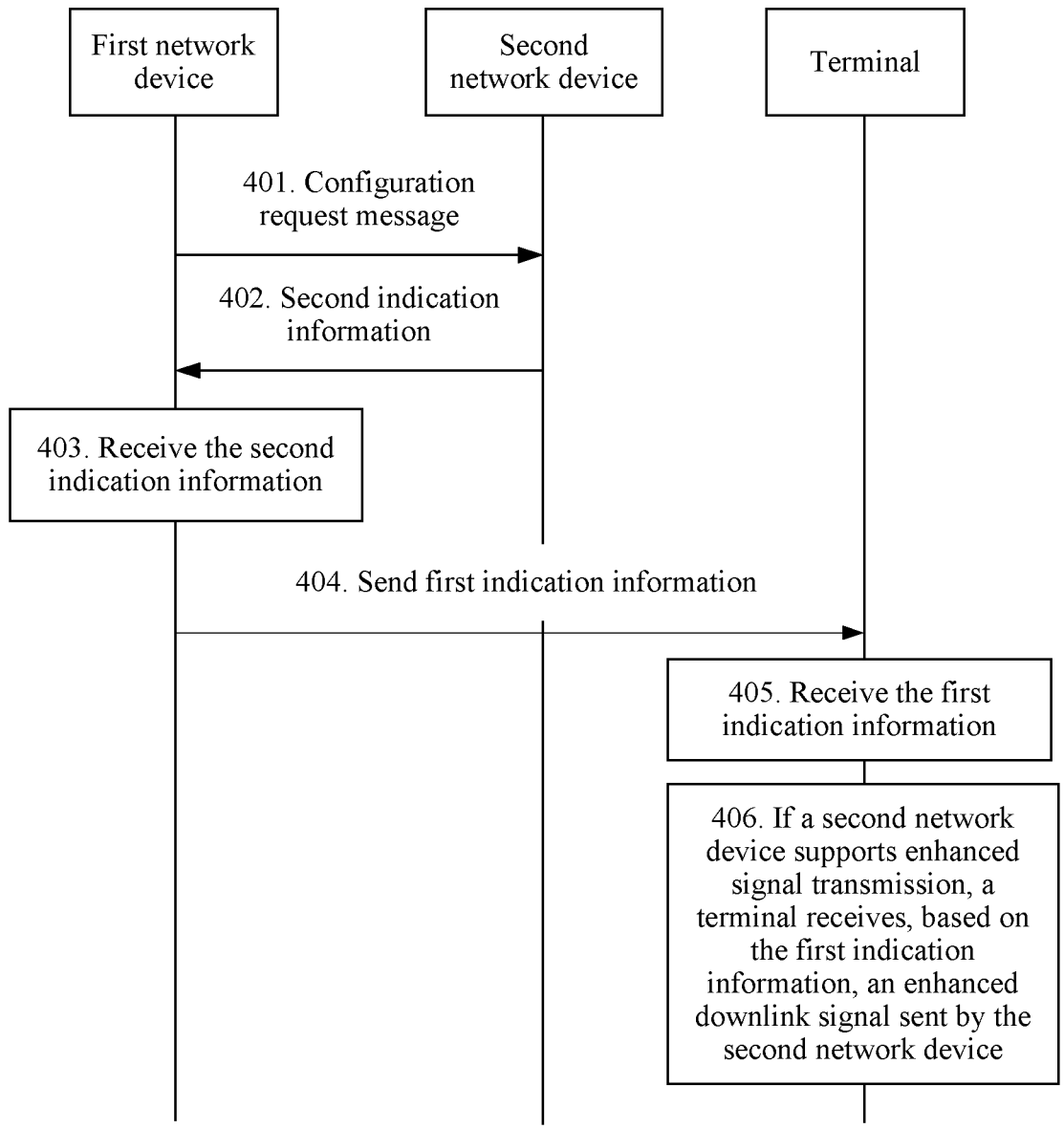
FIG. 4 is a corresponding schematic flowchart of a communication method according to this application.

Based on the above, FIG. 4 is a corresponding schematic flowchart of a communication method according to this application. As shown in FIG. 4, the method includes the following steps:

Step 401: A first network device sends a configuration request message to a second network device, where the second network device is a neighboring network device of the first network device, and this step is optional.

Step 402: The second network device receives the configuration request message, and sends second indication information to the first network device, where the second indication information is used to indicate whether the second network device supports enhanced signal transmission; or if step 401 is not performed, the second network device does not need to receive the configuration request message, that is, the second network device directly sends second indication information to the first network device.

Step 403: The first network device receives the second indication information sent by the second network device.

Step 404: The first network device sends first indication information to a terminal, where the first indication information is used to indicate whether the second network device supports the enhanced signal transmission.

Step 405: The terminal receives the first indication information sent by the first network device.

Step 406: If the second network device supports the enhanced signal transmission, the terminal receives, based on the first indication information, an enhanced downlink signal sent by the second network device.

In this application, the first network device and the second network device are neighboring network devices.

Specifically, in step 404, the first network device may send the first indication information by using a system broadcast message or a radio resource control connection reconfiguration message (Radio Resource Control Connection Reconfiguration). Specifically, the first network device sends the system broadcast message (System Information, SI), and the system broadcast message includes the first indication information; or the first network device sends the radio resource control connection reconfiguration message, and the radio resource control connection reconfiguration message includes the first indication information.

In this application, the first network device sends the first indication information by using the system broadcast message or the radio resource control connection reconfiguration message, and no extra message needs to be added to send the first indication information, so that signaling overheads can be effectively reduced.

In step 405, the terminal is a terminal that accesses the first network device, or the terminal is a terminal camping on the first network device. The first network device may be a network device that supports the enhanced signal transmission or a network device that does not support the enhanced signal transmission. After the terminal is powered on, it cannot be obtained whether a current cell (that is, the first network device) in which the terminal is located supports the enhanced signal transmission. Therefore, a detection manner initially used by the terminal may be different from a downlink signal sending manner supported by the network device. For example, the network device uses an enhanced downlink signal sending manner to send a downlink signal, and the terminal uses a conventional detection manner. In this case, the terminal needs to take a long time to detect a PSS and an SSS, and an enhanced downlink signal is not used. For another example, the network device uses a conventional downlink signal sending manner, and the terminal uses an enhanced downlink signal detection method. In this case, the terminal cannot detect a PSS and an SSS. Therefore, the terminal then performs detection by using the conventional detection method, thereby increasing a delay of detecting the PSS by the terminal. To resolve the foregoing problem, the terminal may receive the first indication information by using the system broadcast message or the radio resource control connection reconfiguration message, obtain whether the second network device supports the enhanced signal transmission, and further use a corresponding detection method to detect the PSS, to avoid unnecessary detection.

In step 406, if the terminal supports the enhanced signal transmission, and the terminal obtains, based on the first indication information, that the second network device supports the enhanced signal transmission, when the terminal needs to detect a synchronization symbol sent by another network device, the terminal may receive, based on the first indication information, the enhanced downlink signal sent by the second network device. For example, the terminal receives an enhanced PSS and an enhanced SSS sent by the second network device, and implements synchronization with the second network device. In this scenario, if a network device supports the enhanced signal transmission, a downlink signal sent by the network device is always an enhanced downlink signal. Therefore, the second network device always sends the enhanced downlink signal.

If the terminal supports the enhanced signal transmission, the terminal obtains, based on the first indication information, that the second network device does not support the enhanced signal transmission, and the terminal may receive, in an existing manner, a downlink signal sent by the second network device.

If the terminal does not support the enhanced signal transmission, the terminal may directly receive, in an existing manner, a downlink signal sent by the second network device.

It can be obtained from the foregoing content that the first network device notifies the terminal whether a neighboring network device of the first network device supports the enhanced signal transmission, so that the terminal can receive, in a corresponding manner, the downlink signal sent by the second network device, for example, a synchronization signal. This effectively shortens a time of performing synchronization by the terminal and the second network device, or effectively shortens a time of obtaining system information of the second network device by the terminal.

The foregoing method may be further used for a PBCH, that is, the first indication information indicates whether the second network device supports an enhanced PBCH.

Figure 5:
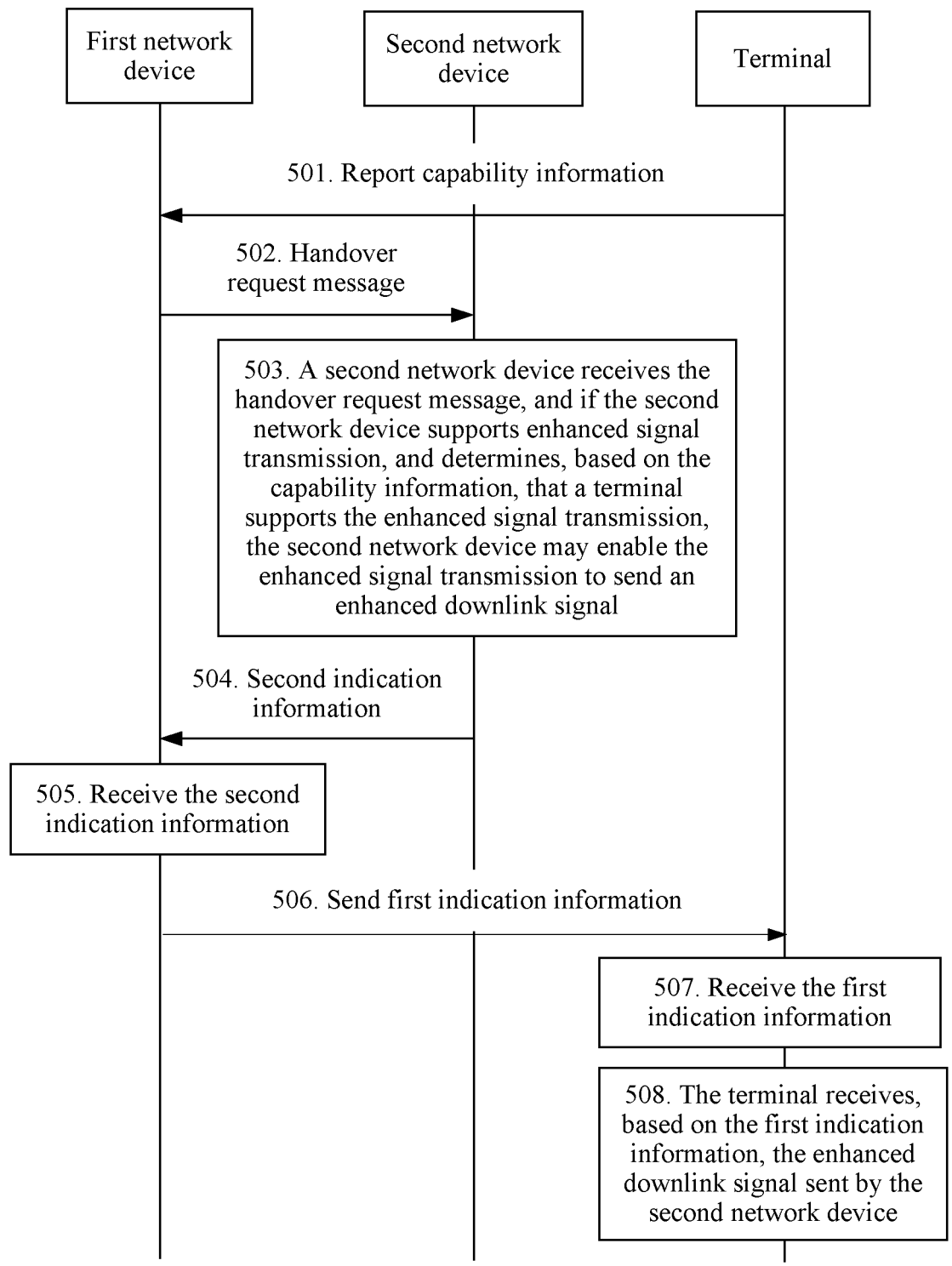
FIG. 5 is a corresponding schematic flowchart of another communication method according to this application.

FIG. 5 is a corresponding schematic flowchart of another communication method according to this application. As shown in FIG. 5, the method includes the following steps:

Step 501: A terminal reports capability information to a first network device, where the capability information is used to indicate whether the terminal supports enhanced signal transmission, and this step is optional. The terminal may indicate the capability information to the first network device in another manner. Regardless of a manner, the terminal needs to indicate the capability information to the first network device.

Step 502: The first network device sends a handover request message to a second network device, where the handover request message includes the capability information of the terminal, and the second network device is a neighboring network device of the first network device.

Step 503: The second network device receives the handover request message, and if the second network device supports the enhanced signal transmission, and determines, based on the capability information, that the terminal supports the enhanced signal transmission, the second network device may enable the enhanced signal transmission to send an enhanced downlink signal; if the second network device supports the enhanced signal transmission, and determines, based on the capability information, that the terminal does not support the enhanced signal transmission, the second network device may still send a downlink signal in an existing manner; or if the second network device does not support the enhanced signal transmission, the second network device sends a downlink signal in an existing manner.

In this scenario (different from the scenario described in FIG. 4), if a network device supports the enhanced signal transmission, under a specific trigger condition (for example, the terminal supporting the enhanced signal transmission is to be handed over), the network device enables the enhanced signal transmission to send the enhanced downlink signal. Otherwise, the network device still sends the downlink signal in the existing manner. Therefore, before receiving the handover request message, the second network device sends the downlink signal in the existing manner. After determining that the terminal supporting the enhanced signal transmission is to be handed over, the second network device enables the enhanced signal transmission to send the enhanced downlink signal.

Step 504: The second network device sends second indication information to the first network device, where the second indication information is used to indicate whether the second network device supports the enhanced signal transmission.

Step 505: The first network device receives the second indication information sent by the second network device.

Step 506: The first network device sends first indication information to the terminal, where the first indication information is used to indicate whether the second network device supports the enhanced signal transmission.

Step 507: The terminal receives the first indication information sent by the first network device.

Step 508: If the second network device supports the enhanced signal transmission, the terminal receives, based on the first indication information, the enhanced downlink signal sent by the second network device.

It can be obtained from the foregoing content that, when the terminal is handed over from a network device to another network device (a target network device), the target network device may determine, based on the capability information of the terminal, whether to enable the enhanced signal transmission to send the enhanced downlink signal. This can effectively avoid a problem that radio resources are excessively occupied because the network device supporting the enhanced signal transmission always sends the enhanced downlink signal. In addition, it can be ensured that the terminal supporting the enhanced signal transmission receives the enhanced downlink signal, thereby shortening a time of performing synchronization by the terminal, or effectively shortening a time of obtaining system information of the second network device by the terminal.

Further, for the methods shown in FIG. 4 and FIG. 5, in a possible scenario, the network device supporting the enhanced signal transmission and the terminal supporting the enhanced signal transmission may preset the enhanced signal transmission. For example, the preset enhanced signal transmission uses any one of the modes in FIG. 3a to FIG. 3d. If the second network device supports the enhanced signal transmission, the first indication information includes an identifier indicating that the enhanced signal transmission is supported, and the identifier may be a bit "1". After receiving the identifier, the terminal may receive, based on the preset enhanced signal transmission, the enhanced downlink signal sent by the second network device. If the second network device does not support the enhanced signal transmission, the first indication information includes an identifier indicating that the enhanced signal transmission is not supported, and the identifier may be a bit "0". After receiving the identifier, the terminal may receive, in the existing manner, the downlink signal sent by the second network device.

Likewise, if the second network device supports the enhanced signal transmission, the second indication information sent by the second network device to the first network device may include an identifier indicating that the enhanced signal transmission is supported. If the second network device does not support the enhanced signal transmission, the second indication information may include an identifier indicating that the enhanced signal transmission is not supported.

In another possible scenario, if the second network device supports the enhanced signal transmission, the second network device may use the second indication information to notify the first network device of configuration information of sending the enhanced downlink signal by the second network device, and then the first network device uses the first indication information to notify the terminal of the configuration information of sending the enhanced downlink signal by the second network device. In this case, the second indication information and/or the first indication information may include only the configuration information of sending the enhanced downlink signal by the second network device. This implicitly indicates that the second network device supports the enhanced downlink transmission, and explicit indication information is not required to indicate that the second network device supports the enhanced downlink transmission. In this application, content included in the first indication information is not specifically limited, provided that the terminal can be notified of the configuration information of sending the enhanced downlink signal by the second network device.

Specifically, the content included in the first indication information may be any one or any combination of the following:

(1) The first indication information includes a repetition count of the enhanced downlink signal sent by the second network device in a specified time length. The specified time length is a length of one timeslot, a length of one subframe, a length of one system frame, a configured time length, or a preset time length. For example, the enhanced downlink signal is an enhanced PSS, and the specified time length is a length of one subframe. If a newly-added PSS in the enhanced PSS is sent on one symbol in a subframe, the enhanced PSS occupies two symbols in the subframe, and is repeatedly sent twice in the subframe. If a newly-added PSS in the enhanced PSS is sent on two symbols in a subframe, the enhanced PSS occupies three symbols in the subframe, and is repeatedly sent three times in the subframe. If a newly-added PSS in the enhanced PSS is sent on three symbols in a subframe (referring to FIG. 3a), the enhanced PSS occupies four symbols in the subframe, and is repeatedly sent four times in the subframe.

In this application, the repetition count of the enhanced downlink signal sent by the second network device in the specified time length may be represented by an enhancement level. For example, an enhancement level 0 indicates that a repetition sending count is 2, and an enhancement level 1 indicates that a repetition sending count is 4. Alternatively, the enhancement level 0 indicates that a repetition sending count is 1 or 2, and the enhancement level 1 indicates that repetition sending count is 3 or 4. A specific repetition sending count in an enhancement level may be further specified. There may be one or more values of repetition sending count in an enhancement level. This is not limited herein.

(2) The first indication information includes time information of sending the enhanced downlink signal by the second network device. The time information includes a symbol number, or the time information includes a subframe number and a symbol number, that is, a number of a specific symbol for sending the enhanced downlink signal by the second network device. For example, the second network device sends a newly-added PSS in addition to a legacy PSS. Newly-added PSSs are sent on a symbol 0 and a symbol 1 of a next timeslot of a timeslot in which the legacy PSS is located. In this case, the time information is a symbol number (that is, the symbol 0 and the symbol 1). The time information may be deduced in another manner. For example, newly-added PSSs are sent on two symbols succeeding a symbol occupied by the legacy PSS, and a symbol number can also be deduced in this case. All these cases shall fall within the protection of the present disclosure, provided that the time information can be exactly determined.

The time information may be an offset (Offset) value, and the offset value is an offset of an enhanced downlink signal sending location to a legacy downlink signal sending location. For example, if a legacy downlink signal is sent on a symbol 6, and an enhanced downlink signal is sent on a symbol 1 of a next timeslot, the offset value is 2.

Specifically, the time information of sending the enhanced downlink signal by the second network device is used to indicate whether the second network device sends enhanced downlink signals on consecutive symbols or spaced symbols. For example, the enhanced downlink signal is an enhanced PSS. If enhanced PSSs are sent on different symbols in one subframe, the first indication information may include only symbol numbers. Therefore, the terminal may obtain, based on the symbol numbers, that the symbols occupied by the enhanced PSSs are consecutive symbols or spaced symbols. For example, in case 1, if the symbol numbers included in the first indication information are a symbol 6, a symbol 0, a symbol 1, and a symbol 2, the terminal may obtain that the symbols occupied by the enhanced PSSs are four consecutive symbols. For details, refer to FIG. 3a. For example, in case 2, if the symbol numbers included in the first indication information are a symbol 6, a symbol 1, and a symbol 2, the terminal may obtain that the symbols occupied by the enhanced PSSs are three nonconsecutive symbols, an interval between a first symbol and a second symbol for sending PSSs is one symbol, and there is no interval between the second symbol and a third symbol for sending PSSs.

If enhanced PSSs are sent on different symbols in two or more subframes, the first indication information may include subframe numbers and symbol numbers. Therefore, the terminal may obtain, based on the subframe numbers and the symbol numbers, that the symbols occupied by the enhanced PSSs are consecutive symbols or spaced symbols. For example, in FIG. 6a, a PSS is used as an example (similar to an SSS and a PBCH). A legacy PSS is sent on a symbol 6 of a first timeslot in each of a subframe 0 and a subframe 5. A newly-added PSS is sent on a symbol 6 of a first timeslot in each of a subframe 1 and a subframe 6, and the time information is subframe numbers 1 and 6 and a symbol number 6 in this case. Another rule of the symbol number is that, in one subframe, symbols are numbered from 0 to 13, and a concept of a timeslot does not need to be used.

Figure 6A:
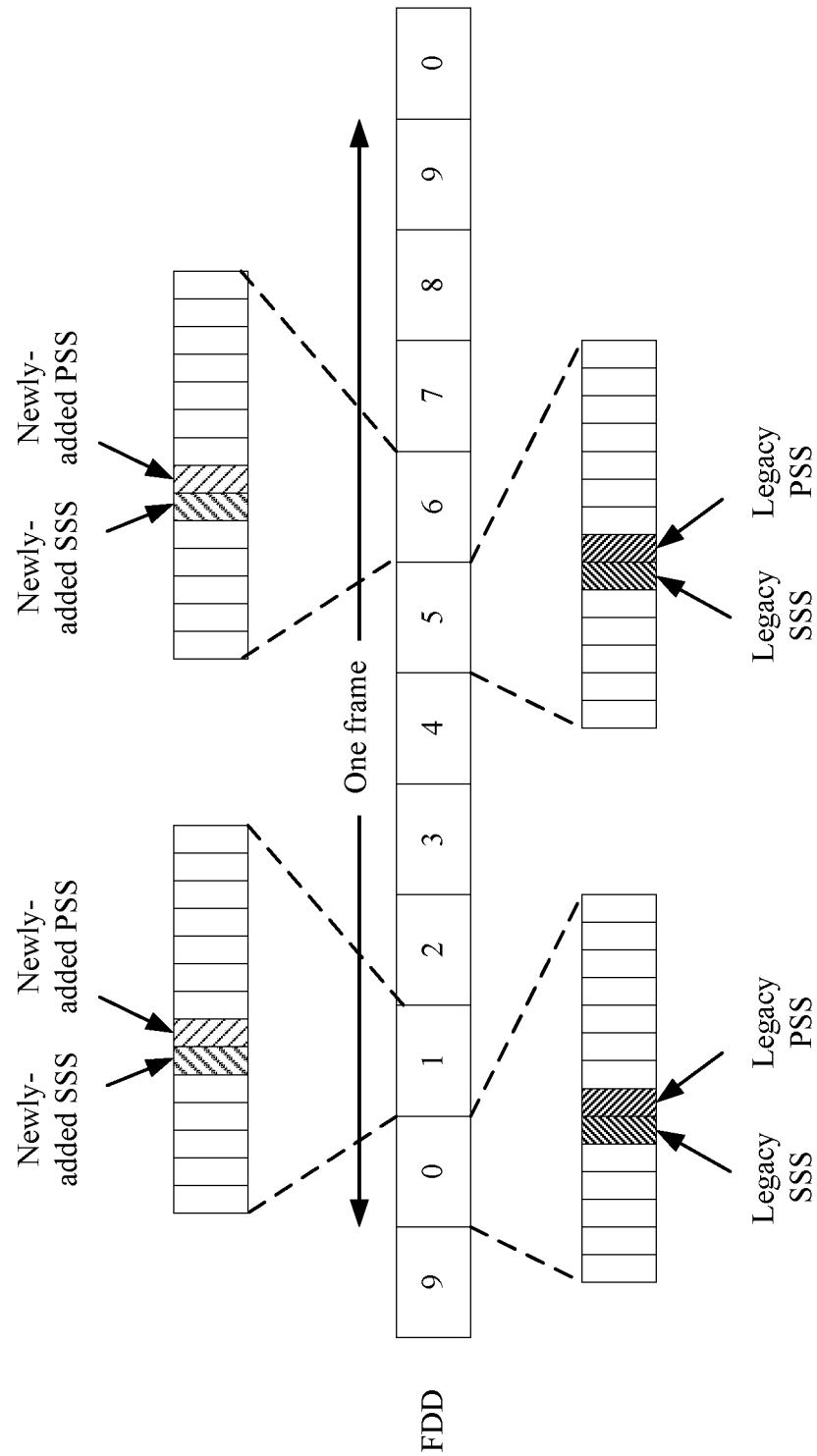
FIG. 6a is a schematic diagram of symbol locations occupied by an enhanced PSS and an enhanced SSS.

In this application, the time information of sending the enhanced downlink signal by the second network device may alternatively be represented by using a sending pattern (Pattern). The sending pattern may be understood as a specific mapping (Mapping) of sending the enhanced downlink signal, that is, a specific time location in which the enhanced downlink signal is sent. As shown in FIG. 6a, a PSS is used as an example. Enhanced PSSs are sent in a subframe 1 and a subframe 6. A specific symbol for sending an enhanced PSS may be represented by a bitmap (Bitmap), that is, 0000001 0000000. Each bit in the bitmap represents a status of one symbol, that is, whether the symbol is used to send an enhanced PSS, where "1" indicates that an enhanced PSS is sent, and "0" indicates that no enhanced PSS is sent. The meanings of "0" and "1" may be exchanged.

(3) The first indication information includes frequency information of sending the enhanced downlink signal by the second network device. The frequency information includes at least one of the following: a resource element location, a narrowband index, or a frequency.

Figure 6B:
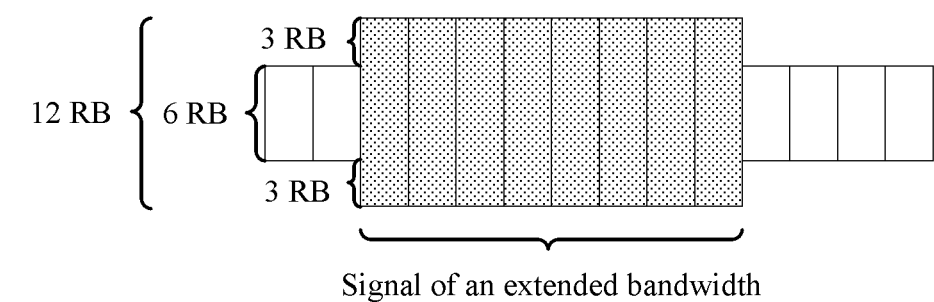
FIG. 6b is a schematic diagram of even distribution of an extended bandwidth.
Figure 6C:
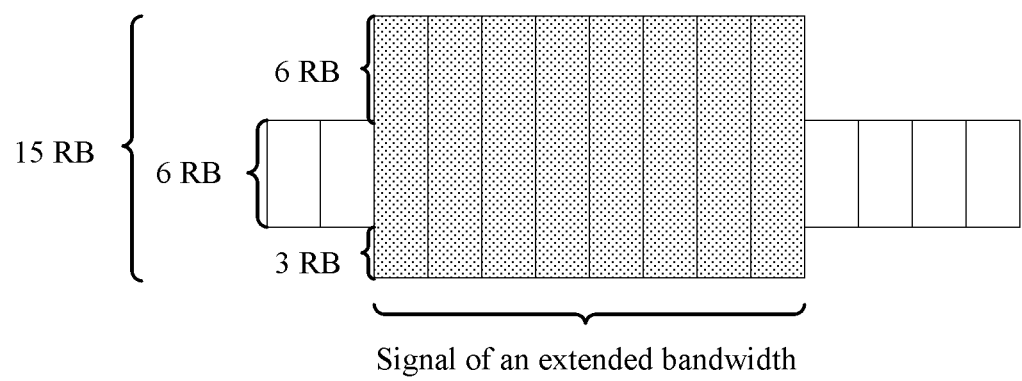
FIG. 6c is a schematic diagram of uneven distribution of an extended bandwidth.

Specifically, the frequency information may be used to indicate an actual bandwidth for sending the enhanced downlink signal. If extended bandwidths are evenly distributed on two sides of a central frequency, other information does not need to be carried. As shown in FIG. 6b, the frequency information may be 12 RBs or 12 PRBs in this case. If the extended bandwidths are not evenly distributed, one piece of indication information may be further carried to indicate an extended bandwidth on one side of the center frequency. As shown in FIG. 6c, the frequency information includes 15 RBs and 6 RBs in this case, that is, a total bandwidth is 15 RBs, 6 RBs are extended on one side, and 3 RBs are extended on the other side.

Alternatively, the frequency information is used to indicate bandwidths extended on two sides of a central frequency. If the bandwidths are evenly distributed, only one piece of frequency information is required. As shown in FIG. 6b, the frequency information is 3 RBs. Otherwise, the extended bandwidths on the two sides need to be indicated. As shown in FIG. 6c, the frequency information is 6 RBs and 3 RBs.

Figure 6D:
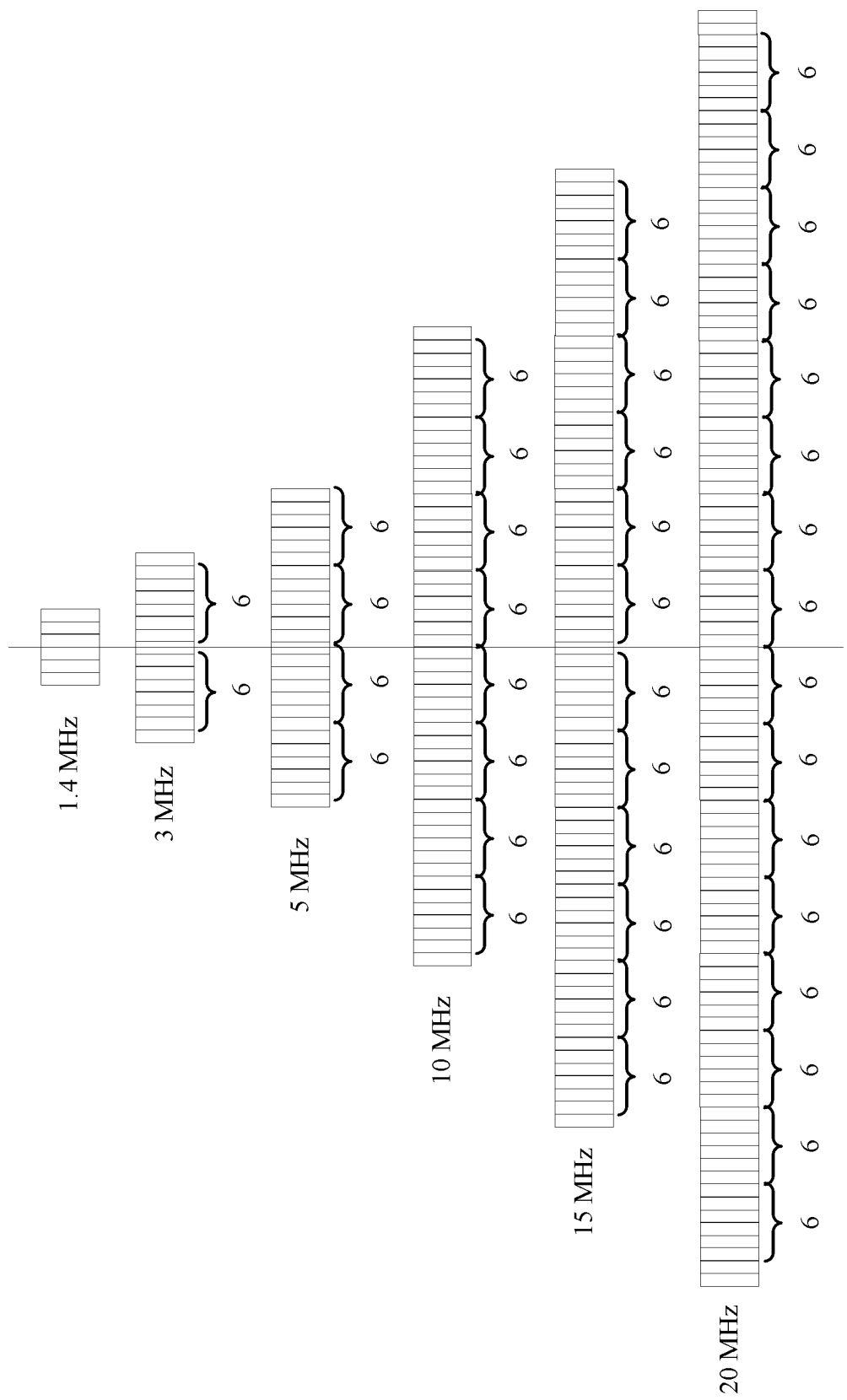
FIG. 6d is a schematic narrowband diagram of different bandwidths.

For the narrowband index, as shown in FIG. 6d, different bandwidths are divided into different narrowbands based on 6 PRBs. For example, a 20 MHz bandwidth is divided into 16 narrowbands, and indexes are successively 0, 1, ..., 14, and 15 from left to right. In this case, the frequency information may be a narrowband index for sending the enhanced downlink signal by the second network device, that is, a specific narrowband on which the second network device sends the enhanced downlink signal.

For the frequency, different network devices may work at different frequencies, and the second network device needs to indicate the frequency information of sending the enhanced downlink signal, for example, a carrier (Carrier) or a frequency (Frequency).

The method described in this application may be applied to a Narrowband Internet of Things (Narrow Band Internet of Things, NB-IoT). If the method is applied to NB-IoT, the first indication information may include at least one of the resource element location, the frequency, or the narrowband index for sending the enhanced downlink signal by the second network device, so that the terminal receives the enhanced downlink signal in the corresponding resource element location, the frequency, or the narrowband.

It should be noted that, when the first indication information includes the foregoing content, the first indication information implicitly indicates that the second network device supports the enhanced signal transmission, so that the terminal can obtain, based on the content included in the first indication information, that the second network device supports the enhanced signal transmission, and receives, based on the content included in the first indication information, the enhanced downlink signal sent by the second network device.

Likewise, if the second network device supports the enhanced signal transmission, the second indication information sent by the second network device to the first network device may also include any one or any combination of the foregoing three types of content. For details, refer to the foregoing description of the first indication information.

In the overall procedure described in FIG. 4 or FIG. 5 in this application, the content included in the first indication information may be totally the same as the content included in the second indication information. For example, the second indication information sent by the second network device to the first network device includes a repetition count of the enhanced downlink signal sent by the second network device in the specified time length. Correspondingly, the first indication information sent by the first network device to the terminal also includes the repetition count of the enhanced downlink signal sent by the second network device in the specified time length. Alternatively, the content included in the first indication information may be different from the content included in the second indication information. For example, the second indication information sent by the second network device to the first network device includes the repetition count of the enhanced downlink signal sent by the second network device in the specified time length, but the first indication information sent by the first network device to the terminal includes the time information of sending the enhanced downlink signal by the second network device. This is not specifically limited in this application.

Figure 7:
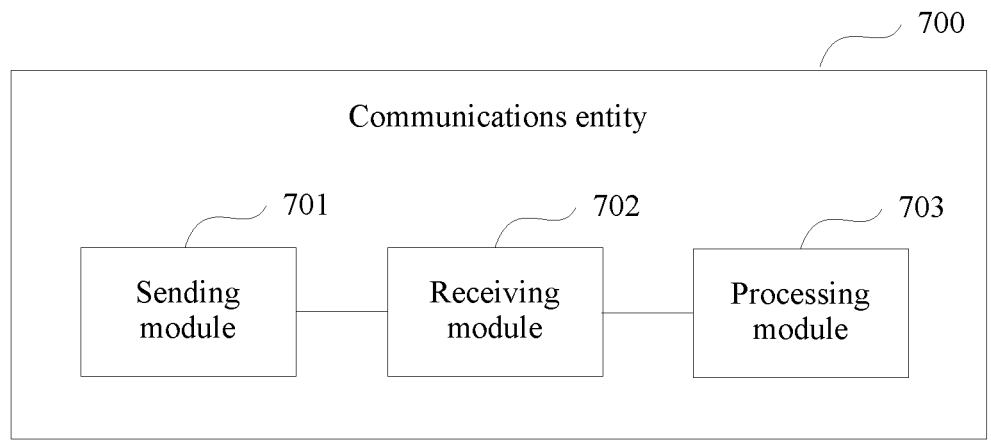
FIG. 7 is a schematic structural diagram of a communications entity according to this application.

Based on the foregoing embodiment, this application provides a communications entity. Referring to FIG. 7, a communications entity 700 may include a sending module 701, a receiving module 702, and a processing module 703. The communications entity may be configured to implement steps of the procedure executed by the terminal or the first network device or the second network device in the method embodiments shown in FIG. 4 and FIG. 5, and description is separately provided below.

(1) The communications entity 700 is configured to implement the steps of the procedure executed by the terminal in the method embodiments shown in FIG. 4 and FIG. 5. In this case, the communications entity 700 may be the terminal or a chip inside the terminal, and details are as follows:

The receiving module 702 is configured to receive first indication information sent by a first network device. The first indication information is used to indicate whether a second network device supports enhanced signal transmission, the second network device is a neighboring network device of the first network device, and the enhanced signal transmission means a repetition transmission of a signal in a specified time length, and/or a signal is transmitted on N subcarriers of a system bandwidth, where N is greater than 72.

The processing module 703 is configured to determine, based on the first indication information, whether the second network device supports the enhanced signal transmission.

The receiving module 702 is further configured to: if the processing module 703 determines that the second network device supports the enhanced signal transmission, receive, based on the first indication information, an enhanced downlink signal sent by the second network device.

In a possible design, the sending module 701 is configured to report capability information to the first network device before the receiving module 702 receives the first indication information sent by the first network device. The capability information is used to indicate that the terminal supports the enhanced signal transmission.

(2) The communications entity 700 is configured to implement the steps of the procedure executed by the first network device in the method embodiments shown in FIG. 4 and FIG. 5. In this case, the communications entity 700 may be the first network device or a chip inside the first network device, and details are as follows:

The receiving module 702 is configured to receive second indication information sent by a second network device. The second indication information is used to indicate whether the second network device supports enhanced signal transmission, the second network device is a neighboring network device of the first network device, and the enhanced signal transmission means a repetition transmission of a signal in a specified time length, and/or a signal is transmitted on N subcarriers of a system bandwidth, where N is greater than 72.

The processing module 703 is configured to determine, based on the second indication information, whether the second network device supports the enhanced signal transmission.

The sending module 701 is configured to send first indication information. The first indication information is used to indicate whether the second network device supports the enhanced signal transmission.

In a possible design, the sending module 701 is specifically configured to:

send a system broadcast message, where the system broadcast message includes the first indication information; or send a radio resource control connection reconfiguration message, where the radio resource control connection reconfiguration message includes the first indication information.

In a possible design, the receiving module 702 is specifically configured to:

receive a configuration update message sent by the second network device, where the configuration update message includes the second indication information.

In a possible design, the receiving module 702 is specifically configured to:

receive a handover response message sent by the second network device, where the handover response message includes the second indication information.

In a possible design, the receiving module is further configured to: before receiving the handover response message sent by the second network device, receive capability information reported by a terminal. The capability information is used to indicate that the terminal supports the enhanced signal transmission.

The sending module 701 is further configured to send a handover request message to the second network device. The handover request message includes the capability information.

(3) The communications entity 700 is configured to implement the steps of the procedure executed by the second network device in the method embodiments shown in FIG. 4 and FIG. 5. In this case, the communications entity 700 may be the second network device or a chip inside the second network device, and details are as follows:

The processing module 703 is configured to generate second indication information. The second indication information is used to indicate whether the second network device supports enhanced signal transmission, and the enhanced signal transmission means a repetition transmission of a signal in a specified time length, and/or a signal is transmitted on N subcarriers of a system bandwidth, where N is greater than 72.

The sending module 701 is configured to send second indication information to a first network device. The first network device is a neighboring network device of the second network device.

In a possible design, the sending module 701 is specifically configured to:

send a configuration update message to the first network device, where the configuration update message includes the second indication information.

In a possible design, the sending module 701 is specifically configured to:

send a handover response message to the first network device, where the handover response message includes the second indication information.

In a possible design, the receiving module 702 is configured to: before the sending module 701 sends the handover response message to the first network device, receive a handover request message sent by the first network device. The handover request message includes capability information of a terminal.

The processing module 703 is further configured to: determine, based on the capability information of the terminal, that the terminal supports the enhanced signal transmission, and then enable the enhanced signal transmission to send an enhanced downlink signal by using the sending module 701.

In this application, the foregoing cases (1), (2), and (3) may further include the following content:

In a possible design, if the second network device supports the enhanced signal transmission, the second indication information includes a repetition count of the enhanced downlink signal sent by the second network device in a specified time length, and the specified time length is a length of one timeslot, a length of one subframe, or a length of one system frame.

In a possible design, if the second network device supports the enhanced signal transmission, the second indication information includes time information of sending the enhanced downlink signal by the second network device; and the time information includes a symbol number, or the time information includes a subframe number and a symbol number.

In a possible design, if the second network device supports the enhanced signal transmission, the second indication information includes frequency information of sending the enhanced downlink signal by the second network device; and the frequency information includes at least one of the following: a resource element location, a narrowband index, and a frequency.

In a possible design, the enhanced downlink signal is any one or any combination of an enhanced primary synchronization signal PSS, an enhanced secondary synchronization signal SSS, and an enhanced physical broadcast channel PBCH.

It should be noted that module division in the embodiments of this application is merely an example, and is merely logical function division, and may be other division in actual implementation. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Figure 8:
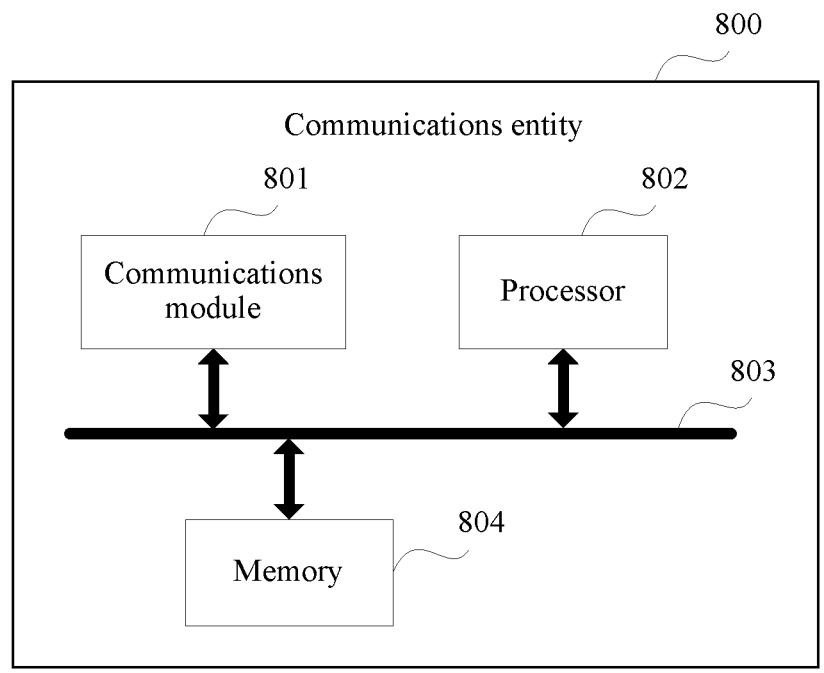
FIG. 8 is a schematic structural diagram of another communications entity according to this application.

Based on the foregoing embodiment, this application provides a communications entity, and the communications entity has a function of the communications entity 7 shown in FIG. 7. Referring to FIG. 8, a communications entity 800 may include a communications module 801 and a processor 802.

The communications module 801 is configured to perform communication interaction with another device, and the communications module 801 may be an RF circuit, a Wi-Fi module, a communications interface, a Bluetooth module, or the like.

The processor 802 is configured to implement a function of the processing module 703 in FIG. 7.

Optionally, the communications entity 800 may further include a memory 804, configured to store a program and the like. Specifically, the program may include program code, and the program code includes an instruction. The memory 804 may include a RAM, and may further include a non-volatile memory (non-volatile memory), for example, at least one magnetic disk memory. The processor 802 executes the application program stored in the memory 804, to implement the foregoing function.

In a possible manner, the communications module 801, the processor 802, and the memory 804 are interconnected by using the bus 803. The bus 803 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 8, but this does not mean that there is only one bus or only one type of bus.

All or some of the foregoing embodiments may be implemented by software, hardware, firmware, or any combination thereof. When software is used to implement the embodiments, the embodiments may be implemented entirely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a Solid State Disk (SSD)), or the like.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
   receiving, by a terminal, first indication information from a first network device, the first indication information indicating whether a second network device supports an enhanced physical broadcast channel (PBCH), the first indication information indicating a number of a specific symbol of sending the enhance downlink signal by the second network device, the first indication information comprises a repetition count of the enhanced PBCH in one subframe, the second network device is a neighboring network device of the first network device, and the enhanced PBCH is a repetition transmission of a PBCH in a time length; and
   receiving, by the terminal according to the first indication information, an enhanced PBCH from the second network device if the first indication information indicates the second network device supports the enhanced PBCH.

2. The method according to claim 1, wherein the first indication information is comprised in a radio resource control connection reconfiguration message from the first network device.

3. The method according to claim 1, wherein the method further comprises:
   reporting, by the terminal, capability information to the first network device, the capability information indicating that the terminal supports the enhanced signal transmission.

4. The method according to claim 1, wherein the time length is a length of one timeslot, a length of one subframe, or a length of one system frame.

5. The method according to claim 1, wherein the first indication information is indicated by one bit.

6. An apparatus, comprising:
   one or more processors, and
   a non-transitory storage medium coupled to the one or more processors and configured to store program instructions that when executed by the one or more processors, perform operations comprising:
   receiving first indication information from a first network device, the first indication information indicating whether a second network device supports an enhanced physical broadcast channel (PBCH), the first indication information indicating a number of a specific symbol of sending the enhance downlink signal by the second network device, the first indication information comprises a repetition count of the enhanced PBCH in one subframe, the second network device is a neighboring network device of the first network device, and the enhanced PBCH is a repetition transmission of a PBCH in a time length; and
   receiving an enhanced PBCH according to the first indication information from the second network device if the first indication information indicates the second network device supports the enhanced PBCH.

7. The apparatus according to claim 6, wherein the first indication information is comprised in a radio resource control connection reconfiguration message from the first network device.

8. The apparatus according to claim 6, wherein the operations further comprise:
   reporting capability information to the first network device, the capability information indicating that the apparatus supports the enhanced signal transmission.

9. The apparatus according to claim 6, wherein the time length is a length of one timeslot, a length of one subframe, or a length of one system frame.

10. The apparatus according to claim 6, wherein the first indication information is indicated by one bit.

11. A communication method, comprising:
    receiving, by a first network device, second indication information from a second network device, the second indication information indicating the second network device supports an enhanced physical broadcast channel (PBCH), the first indication information indicating a number of a specific symbol of sending the enhance downlink signal by the second network device, the first indication information comprises a repetition count of the enhanced PBCH in one subframe, the second network device is a neighboring network device of the first network device, and the enhanced PBCH is a repetition transmission of a PBCH in a time length; and
    sending, by the first network device, first indication information to a terminal, the first indication information indicating whether the second network device supports the enhanced PBCH.

12. The method according to claim 11, wherein the sending, by the first network device, the first indication information comprises:
    sending, by the first network device, a radio resource control connection reconfiguration message, the radio resource control connection reconfiguration message comprising the first indication information.

13. The method according to claim 11, wherein the receiving, by the first network device, the second indication information from the second network device comprises:
    receiving, by the first network device, a handover response message from the second network device, the handover response message comprising the second indication information.

14. The method according to claim 11, wherein the method further comprises:
receiving, by the first network device, capability information reported by the terminal, the capability information indicating that the terminal supports the enhanced signal transmission; and
sending, by the first network device, a handover request message to the second network device, the handover request message comprising the capability information.

15. The method according to claim 11, wherein the time length is a length of one timeslot, a length of one subframe, or a length of one system frame.

16. The method according to claim 11, wherein the first indication information is indicated by one bit.

17. A non-transitory storage medium configured to store program instructions; wherein when the program instructions are executed by a computer, the instructions cause the computer to perform:

receiving first indication information from a first network device, the first indication information indicating whether a second network device supports an enhanced physical broadcast channel (PBCH), the first indication information indicating a number of a specific symbol of sending the enhance downlink signal by the second network device, the first indication information comprises a repetition count of the enhanced PBCH in one subframe, the second network device is a neighboring network device of the first network device, and the enhanced PBCH is a repetition transmission of a PBCH in a time length; and if the first indication information indicates the second network device supports the enhanced PBCH, receiving according to the first indication information, an enhanced PBCH from the second network device.

* * * * *